(12) United States Patent
Saito

(10) Patent No.: US 10,706,327 B2
(45) Date of Patent: Jul. 7, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yuki Saito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 260 days.

(21) Appl. No.: 15/661,624

(22) Filed: Jul. 27, 2017

(65) Prior Publication Data

US 2018/0039861 A1    Feb. 8, 2018

(30) Foreign Application Priority Data

Aug. 3, 2016    (JP) ................................ 2016-153212

(51) Int. Cl.
| | | |
|---|---|---|
| G06K 9/62 | (2006.01) | |
| G06N 3/08 | (2006.01) | |
| G06N 3/04 | (2006.01) | |
| G06K 9/46 | (2006.01) | |
| G06K 9/66 | (2006.01) | |

(52) U.S. Cl.
CPC ......... *G06K 9/6262* (2013.01); *G06K 9/4642* (2013.01); *G06K 9/627* (2013.01); *G06K 9/6256* (2013.01); *G06K 9/6269* (2013.01); *G06K 9/66* (2013.01); *G06N 3/0454* (2013.01); *G06N 3/082* (2013.01); *G06N 3/084* (2013.01)

(58) Field of Classification Search
CPC .......... G06N 3/08; G06N 3/084; G06N 20/00; G06T 2207/20081; G10L 15/063; H04L 43/0823; G05D 1/0221
See application file for complete search history.

(56) References Cited

U.S. PATENT DOCUMENTS

| | | | | |
|---|---|---|---|---|
| 5,428,710 A | * | 6/1995 | Toomarian | ............... G06N 3/08 706/25 |
| 5,555,439 A | * | 9/1996 | Higashino | .............. G06N 3/084 706/25 |
| 9,406,017 B2 | | 8/2016 | Hinton et al. | |
| 10,540,798 B1 | * | 1/2020 | Walters | .................. G06N 20/00 |

(Continued)

FOREIGN PATENT DOCUMENTS

| | | |
|---|---|---|
| JP | 2014203289 A | 10/2014 |
| WO | 2014105866 A1 | 7/2014 |

OTHER PUBLICATIONS

Krizhevsky et al. "ImageNet Classification with Deep Convolutional Neural Networks." Advances in Neural Information Processing Systems 25 (NIPS). 2012:1-9. Cited in Specification.

(Continued)

*Primary Examiner* — Ian L Lemieux
(74) *Attorney, Agent, or Firm* — Rossi, Kimms & McDowell LLP

(57) ABSTRACT

There is provided with an information processing apparatus. A processing unit obtains output data by inputting training data to a recognition unit. A determination unit determines an error in a discrimination result for the training data obtained by inputting the output data to a plurality of discriminators. A first training unit trains the recognition unit based on the error in the discrimination result.

21 Claims, 13 Drawing Sheets

(56) References Cited

U.S. PATENT DOCUMENTS

| | | | |
|---|---|---|---|
| 2005/0190963 A1* | 9/2005 | Li ..................... | G06K 9/00234 |
| | | | 382/159 |
| 2006/0210141 A1* | 9/2006 | Kojitani ............... | G06K 9/6269 |
| | | | 382/141 |
| 2009/0310820 A1* | 12/2009 | Williams ................. | G06K 9/32 |
| | | | 382/103 |
| 2010/0272351 A1* | 10/2010 | Kato .................. | G06K 9/00986 |
| | | | 382/159 |
| 2013/0138436 A1* | 5/2013 | Yu ........................... | G06N 3/04 |
| | | | 704/232 |
| 2014/0180986 A1 | 6/2014 | Hinton et al. | |
| 2014/0304236 A1 | 10/2014 | Hachiya | |
| 2015/0161522 A1* | 6/2015 | Saon ........................ | G06N 3/08 |
| | | | 706/12 |
| 2016/0335536 A1* | 11/2016 | Yamazaki ............. | G06N 3/0454 |
| 2017/0200265 A1* | 7/2017 | Bhaskar ................. | G06T 7/0006 |
| 2017/0351948 A1* | 12/2017 | Lee ......................... | G06N 3/084 |
| 2018/0108139 A1* | 4/2018 | Abramoff ................. | G06T 7/11 |
| 2019/0012594 A1* | 1/2019 | Fukuda ................... | G10L 15/16 |
| 2019/0122120 A1* | 4/2019 | Wu ........................ | G06N 3/0472 |
| 2019/0258935 A1* | 8/2019 | Umeda .................. | G06N 3/084 |
| 2019/0378017 A1* | 12/2019 | Kung ..................... | G06N 20/10 |
| 2019/0385019 A1* | 12/2019 | Bazrafkan ................ | G06N 3/08 |

OTHER PUBLICATIONS

Tang. "Deep Learning using Linear Support Vector Machines." International Conference on Machine Learning 2013: Challenges in Representation Learning. 2013. Cited in Specification.

Zhang et al. "Deep Neural Support Vector Machines for Speech Recognition." 2015 IEEE International Conference on Acoustics, Speech and Signal Processing (ICASSP). 2015. Cited in Specification.

Xie et al. "Unsupervised Deep Embedding for Clustering Analysis." Proceedings of the 33rd International Conference on Machine Learning. 2016:478-487. vol. 48. Cited in Specification.

Grabner et al. "Real-Time Tracking via On-line Boosting.", Proceedings of the British Machine Conference. Sep. 2006:6.1-6.10. Cited in Specification.

Hachiya et al. "NSH: Normality Sensitive Hashing for Anomaly Detection." IEEE International Conference on Computer Vision Workshops (ICCVW). 2013:795-802. Cited in Specification.

Szegedy et al. "Going Deeper with Convolutions." Conference on Computer Vision and Pattern Recognition. 2015:1-9. Cited in Specification.

Scholkopf et al. "Learning with Kernels: Support Vector Machines, Regularization, Optimization, and Beyond." 2001:1-644. The MIT Press. Cambridge, Massachusetts. London, England. Cited in Specification.

Rahimi et al. "Random Features for Large-Scale Kernel Machines." Advances in Neural Information Processing Systems 20 (NIPS 2007). 2007:1-8. Cited in Specification.

Datar et al. "Locality-Sensitive Hashing Scheme Based on p-Stable Distributions.", SoCG. 2004:253-262. Cited in Specification.

Viola et al. "Rapid Object Detection Using a Boosted Cascade of Simple Features." Accepted Conference on Computer Vision and Pattern Recognition. 2001:1-9. Cited in Specification.

* cited by examiner

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

There are known apparatuses and methods for training a recognition system using training data to recognize, for example, an object and its state from data such as a video image, and determining input data using the recognition system after training. As one of such methods, there is known a method using a neural network (NN). For example, Krizhevsky discloses a method of automatically recognizing a type of object included in an image using an NN (A. Krizhevsky et al. "ImageNet Classification with Deep Convolutional Neural Networks", Advances in Neural Information Processing Systems 25 (NIPS), 2012). In Krizhevsky, a convolutional neural network (CNN) is used as an NN. The CNN has as its feature to include a convolutional layer for performing a local convolution process. According to Krizhevsky, U.S. Patent Application Publication No. 2014/0180986, and International Publication No. 2014/105866, by performing a process of stochastically turning off neurons forming an NN, overtraining is suppressed and the generalization ability of the NN is improved.

In recent years, a technique using an output from the NN as an input to another discriminator or a probability model has been studied/developed extensively. For example, Tang discloses a method of simultaneously training a CNN and Linear SVMs (Linear Support Vector Machines) each of which receives an output from the CNN (Y. Tang. "Deep Learning using Linear Support Vector Machines", ICML 2013 Challenges in Representation Learning, 2013). In Tang, training errors of the SVMs are used to train the CNN. Zhang discloses a method of simultaneously training a CNN and Structured SVMs each of which receives an output from the CNN (S. Zhang et al. "Deep neural support vector machines for speech recognition", 2015 IEEE International Conference on Acoustics, Speech and Signal Processing (ICASSP), 2015. Xie discloses a method of simultaneously training a CNN and a classifier which performs clustering based on an output from the CNN (J. Xie et al. "Unsupervised deep embedding for clustering analysis", arXiv: 1511.06335, 2015, http://lib-arxiv-008.serverfarm.cornell.edu/abs/1511.06335).

SUMMARY OF THE INVENTION

According to an embodiment of the present invention, an information processing apparatus comprises: a processing unit configured to obtain output data by inputting training data to a recognition unit; a determination unit configured to determine an error in a discrimination result for the training data obtained by inputting the output data to a plurality of discriminators; and a first training unit configured to train the recognition unit based on the error in the discrimination result.

According to another embodiment of the present invention, an information processing apparatus comprises: a processing unit configured to obtain output data by inputting training data to a recognition unit; a determination unit configured to determine an error in a discrimination result for the training data obtained by inputting the output data to a plurality of discriminators; and a second training unit configured to train the plurality of discriminators based on the error in the discrimination result.

According to still another embodiment of the present invention, an information processing apparatus comprises: a processing unit configured to obtain output data by inputting input data to a recognition unit; and a discrimination unit configured to obtain a discrimination result for the input data by inputting the output data to a plurality of discriminators.

According to yet another embodiment of the present invention, an information processing apparatus for training a recognition unit of a system which obtains a discrimination result for input data by inputting, to a discriminator, output data obtained by inputting the input data to the recognition unit, comprises: a unit configured to train the recognition unit by deteriorating discrimination ability of the discriminator, and backpropagating, to the recognition unit, an error in a discrimination result obtained by inputting, to the discriminator with the deteriorated discrimination ability, output data obtained by inputting training data to the recognition unit.

According to still yet another embodiment of the present invention, an information processing apparatus comprises: a processing unit configured to obtain output date by inputting training date to a recognition unit; a determination unit configured to determine an error in a discrimination result for the training data obtained by inputting the output data to a plurality of discriminators; a first training unit configured to train the recognition unit by backpropagating the error in the discrimination result to the recognition unit; and a second training unit configured to perform one-class training of the plurality of discriminators based on the error in the discrimination result.

According to yet still another embodiment of the present invention, an information processing method comprises: obtaining output data by inputting training data to a recognition unit; determining an error in a discrimination result for the training data obtained by inputting the output data to a plurality of discriminators; and training the recognition unit based on the error in the discrimination result.

According to still yet another embodiment of the present invention, a non-transitory computer-readable medium stores a program which, when executed by a computer comprising a processor and a memory, causes the computer to: obtain output data by inputting training data to a recognition unit; determine an error in a discrimination result for the training data obtained by inputting the output data to a plurality of discriminators; and train the recognition unit based on the error in the discrimination result.

Further features of the present invention will become apparent from the following description of exemplary embodiments (with reference to the attached drawings).

DESCRIPTION OF THE EMBODIMENTS

Figure 1:
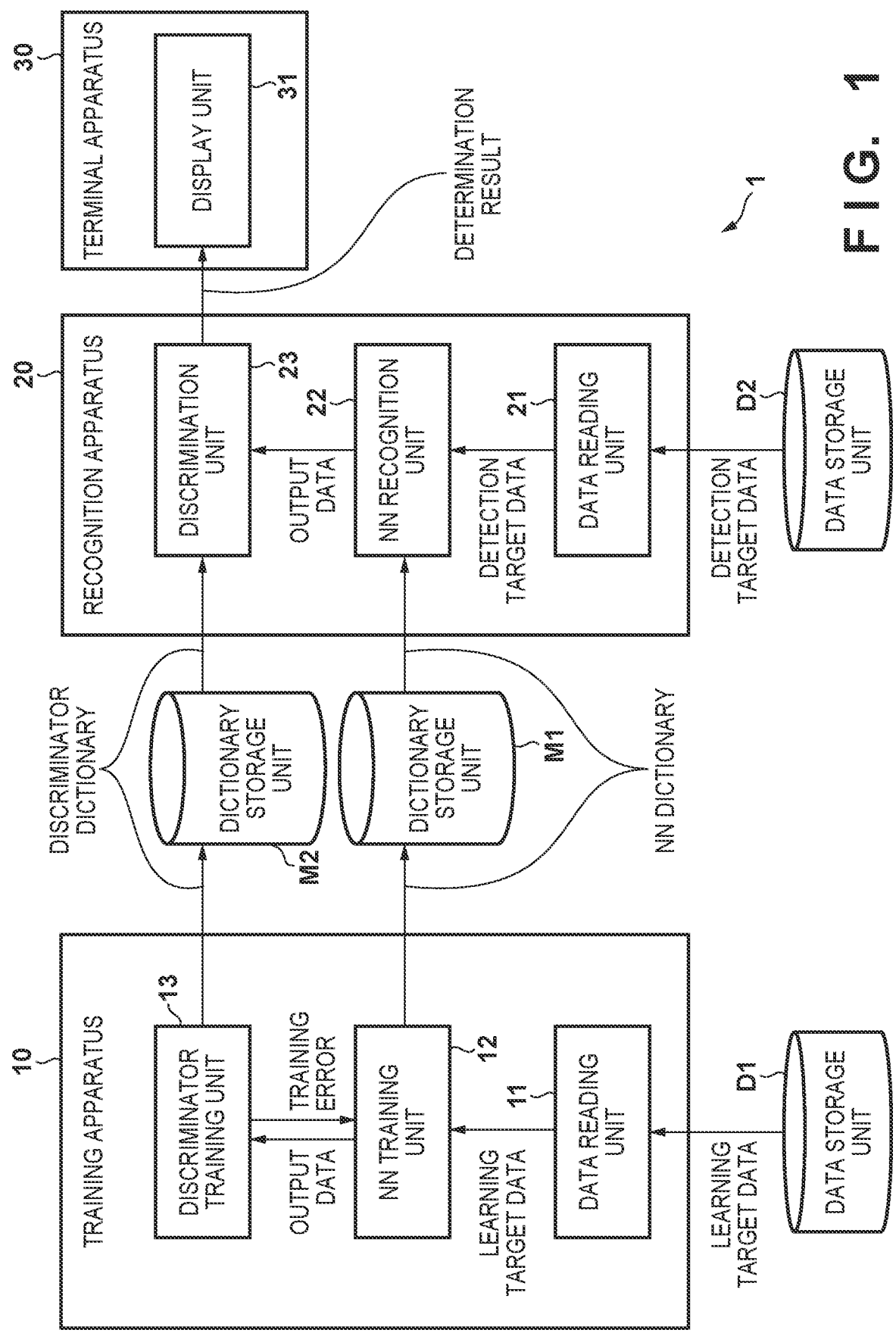
FIG. 1 is a block diagram showing an example of the arrangement of an anomaly detection system according to an embodiment.

A recognition system with further improved recognition ability is desired to recognize input data at higher accuracy.

An embodiment of the present invention improves the data recognition accuracy of a recognition system.

Embodiments of the present invention will be described below with reference to the accompanying drawings. Note that the embodiments to be described below are merely examples when the present invention is practiced concretely, and are practical embodiments of arrangements described in the appended claims.

According to the following embodiments, it is possible to recognize a recognition target by performing a discrimination process for detection target data. For example, if image data is set as detection target data, it is possible to perform object recognition in an image, anomaly recognition of an image, and the like. In the following embodiments, an application example of detecting whether an abnormality is included in an object in a video will be mainly explained. The present invention, however, is not limited to such arrangement. In addition, detection target data need not be one image, and a plurality of successive images may be input to a neural network (NN). The detection target data is not limited to the image and may be, for example, an audio or the like.

In some embodiments, to improve the recognition accuracy, a plurality of discriminators are used in combination with an NN. To implement this arrangement, there is disclosed a method of training a plurality of discriminators and an NN. Especially, in some embodiments, an NN is trained based on errors of a plurality of discriminators. In some embodiments, a discriminator is trained based on errors of a plurality of discriminators. Some embodiments will describe a method of training a discriminator in consideration of the similarity between the plurality of discriminators. Furthermore, in some embodiments, a training method called "drop-out" is used to improve the recognition accuracy. Note, however, that it is not essential to adopt all the above arrangements.

Note that each unit of an anomaly detection system 1 to be described in the following embodiment can be implemented by dedicated hardware or a computer. For example, at least one of a data reading unit 11, an NN training unit 12, a discriminator training unit 13, a data reading unit 21, an NN recognition unit 22, and a discrimination unit 23 can be implemented by a computer. To implement these functions, each functional component is expressed by a program, and the program is loaded into a computer. That is, in a computer including a memory and a processor, the processor can perform processes in accordance with the programs stored in the memory, thereby implementing these functions. A training apparatus 10, a recognition apparatus 20, and a terminal apparatus 30 will be described as separate apparatuses below. However, these apparatuses may be integrated into one or two apparatuses. Furthermore, in FIG. 1, dictionary storage units M1 and M2 and data storage units D1 and D2 exist outside the training apparatus 10 and the recognition apparatus 20. However, these storage units may be included in the training apparatus 10 or the recognition apparatus 20.

First Embodiment

In the first embodiment as one embodiment of the present invention, it is possible to obtain output data by inputting detection target data to a neural network (NN) as input data, and obtain the recognition result of the input data by inputting the output data to each discriminator. To perform such discrimination, a training process is performed, using training data, for the NN and the discriminators each of which receives an output from the NN at the same time. In this embodiment, a plurality of discriminators are used for discrimination. More specifically, a plurality of hash functions are used.

In this embodiment, as a practical example, an example of an arrangement when an information processing apparatus according to the present invention is applied to an anomaly detection system will be described. Especially in this embodiment, a system having a function of detecting an abnormality in a video captured by a monitoring camera is used as an anomaly detection system. This embodiment will be described below with reference to the accompanying drawings.

An anomaly detection system according to this embodiment determines, based on video data obtained by capturing a monitoring target by an image capturing apparatus such as a camera, whether an abnormality is included in the monitoring target. If it is determined that an abnormality is included, a warning is given. For example, it is possible to give a warning to a monitor who resides in a monitoring center such as a security office. This monitoring target includes, for example, the insides and outsides of ordinary houses, or public facilities such as hospitals and stations.

[Overall Arrangement]

FIG. 1 is a schematic block diagram showing an example of the arrangement of an anomaly detection system according to the first embodiment. The arrangement of an anomaly detection system 1 shown in FIG. 1 will be described first. The anomaly detection system 1 shown in FIG. 1 includes a training apparatus 10, a recognition apparatus 20, and a terminal apparatus 30. These apparatuses and the respective units in these apparatuses may be connected via an electronic circuit, an external storage device, or a network. As the network, for example, a portable telephone network, the Internet, or the like can be used.

In this embodiment, the operation of the anomaly detection system 1 can be divided into two phases. The first phase is a training phase and the second phase is a recognition phase.

Figure 2:
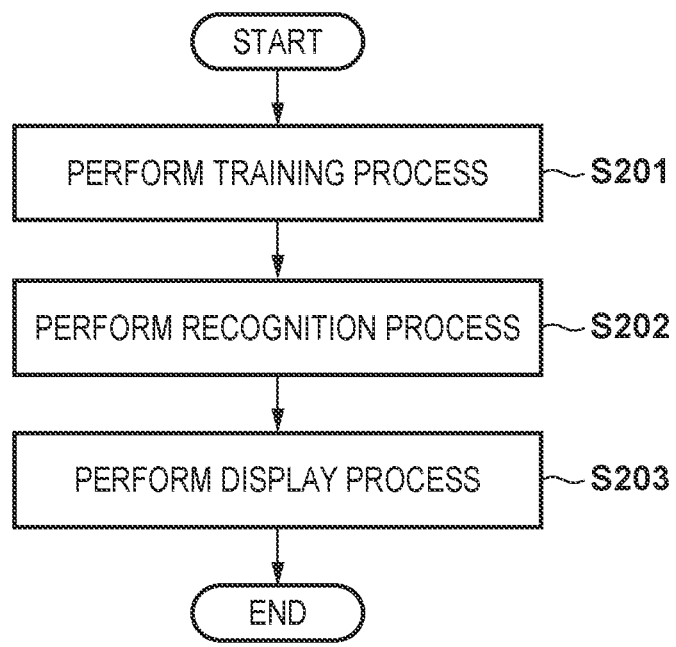
FIG. 2 is a flowchart illustrating an example of the operation of the anomaly detection system according to an embodiment.

The training phase corresponds to step S201 of FIG. 2. In step S201, the training apparatus 10 trains an NN and discriminators using training data as input data.

The recognition phase corresponds to steps S202 and S203 of FIG. 2. In step S202, the recognition apparatus 20 performs recognition/discrimination using the NN and discriminators by processing, as input data, video data (to be referred to as detection target data hereinafter) including a monitoring target, and determines whether an abnormality is included in the monitoring target. In step S203, the terminal apparatus 30 performs a warning process based on the abnormality determination result.

An outline of the operation of the anomaly detection system 1 will be described below by dividing the operation into an operation in the training phase and an operation in the recognition phase. The detailed arrangement and operation of each processing unit will be described later.

The operation in the training phase is performed by the training apparatus 10. The training apparatus 10 includes a data reading unit 11, an NN training unit 12, and a discriminator training unit 13. An outline of the operation of the training apparatus 10 will be described with reference to FIG. 3.

In step S700, the data reading unit 11 reads out, from a data storage unit D1, learning target data for training the NN and discriminators, and sends it to the NN training unit 12. In steps S701 to S717, the NN training unit 12 and the discriminator training unit 13 perform training using the readout learning target data. At this time, the NN training unit 12 performs recognition using the NN by setting, as input data, training data generated based on the learning target data, and the discriminator training unit 13 performs training using the recognition result of the NN (output data of the NN) as input data. A training error by the discriminator training unit 13 at this time is input to the NN training unit 12, and used for a training process by the NN training unit 12. In step S718, the NN training unit 12 saves the dictionary of the trained NN in a dictionary storage unit M1. The discriminator training unit 13 saves the dictionaries of the trained discriminators in a dictionary storage unit M2.

The operation in the recognition phase is performed by the recognition apparatus 20. The recognition apparatus 20 includes a data reading unit 21, an NN recognition unit 22, and a discrimination unit 23. Among them, the NN recognition unit 22 obtains output data by inputting detection target data to the NN. The discrimination unit 23 obtains the discrimination result of the detection target data by inputting output data from the NN to each discriminator. An outline of the operation of the recognition apparatus 20 will be briefly explained with reference to FIG. 4.

In step S1300, the data reading unit 21 reads out detection target data from a data storage unit D2, and sends it to the NN recognition unit 22. In steps S1301 to S1306, the NN recognition unit 22 performs a recognition process for the detection target data, and sends a recognition result (the output data of the NN) to the discrimination unit 23. In steps S1307 to S1309, the discrimination unit 23 performs a discrimination process and an abnormality determination process using the recognition result of the NN as input data, and sends an abnormality determination result to the terminal apparatus 30.

An outline of the operation of the terminal apparatus 30 will be described next. The terminal apparatus 30 includes a display unit 31. As the terminal apparatus 30, for example, the display of a PC (Personal Computer), a tablet PC, a smartphone, a feature phone, or the like can be used.

If an abnormality determination result indicating that a detection target is abnormal is sent, the display unit 31 receives the result and performs a warning process in step S403. At this time, any warning process may be performed in accordance with the function of the terminal apparatus 30. For example, the display unit 31 can give a warning using display, an audio, or the like. As an example, if the terminal apparatus 30 has a siren, the display unit 31 can cause the terminal apparatus 30 to generate a warning sound. The display unit 31 can also cause the display of the terminal apparatus 30 to perform blinking display. Furthermore, if the terminal apparatus 30 includes a video confirmation display, a portion where an abnormality is detected on a monitoring video may be highlighted. To highlight the portion where the abnormality is detected, it is necessary to specify the abnormal portion on the monitoring video. To do this, for example, screen coordinate information indicating a position in the video may be added to the data input to the NN, and then warning display may be performed using the screen coordinate information in accordance with the abnormality determination result.

[Training Phase]

The arrangements and operations of the processing units of each apparatus will be described in detail below. The NN training unit 12 and the discriminator training unit 13 will first be described in detail.

Figure 5:
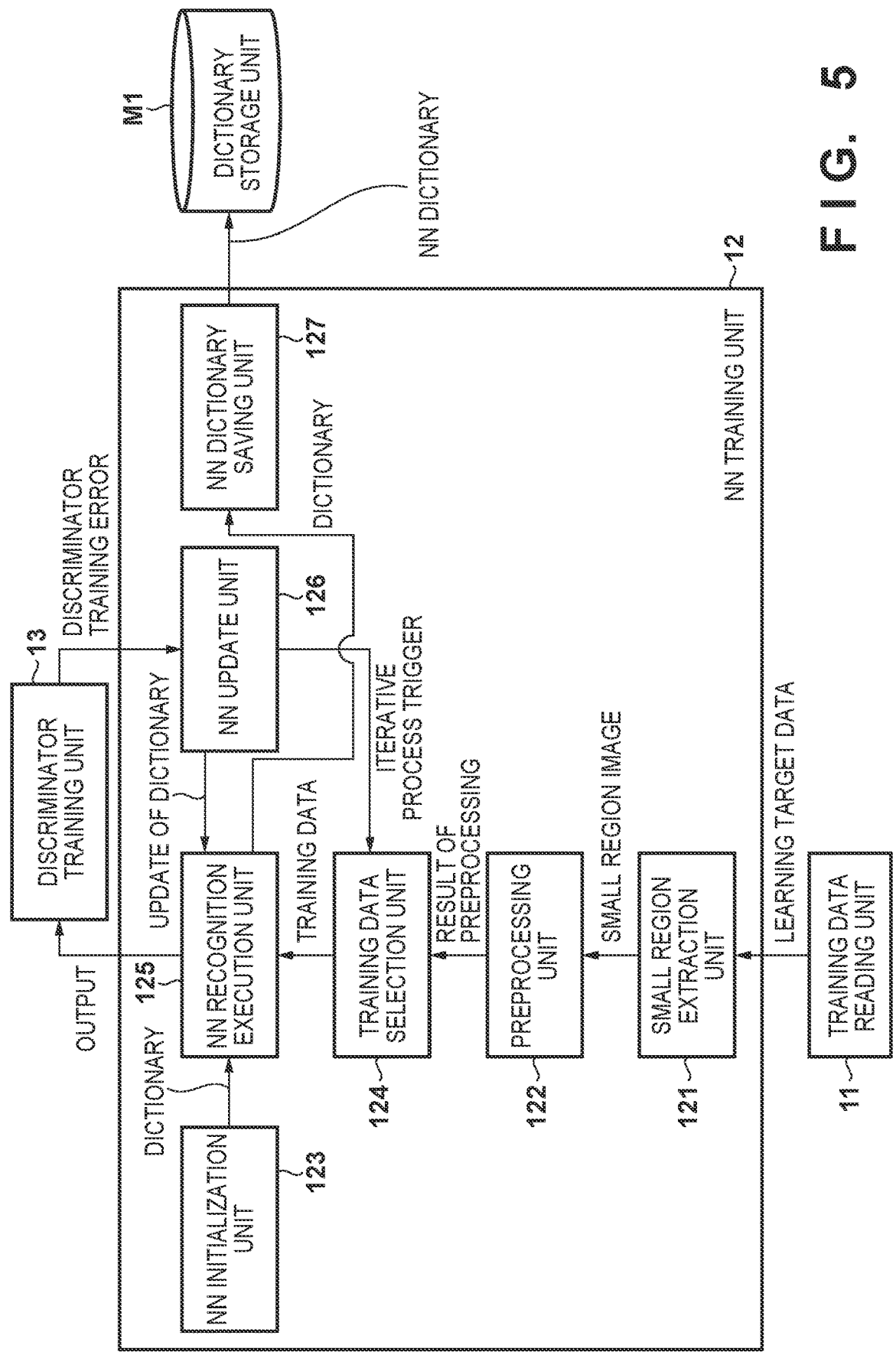
FIG. 5 is a block diagram showing an example of the arrangement of an NN training unit 12 according to an embodiment.

The arrangement of the NN training unit 12 will be described with reference to FIG. 5. The NN training unit 12 includes a small region extraction unit 121, a preprocessing unit 122, an NN initialization unit 123, a training data selection unit 124, an NN recognition execution unit 125, an NN update unit 126, and an NN dictionary saving unit 127.

Figure 6:
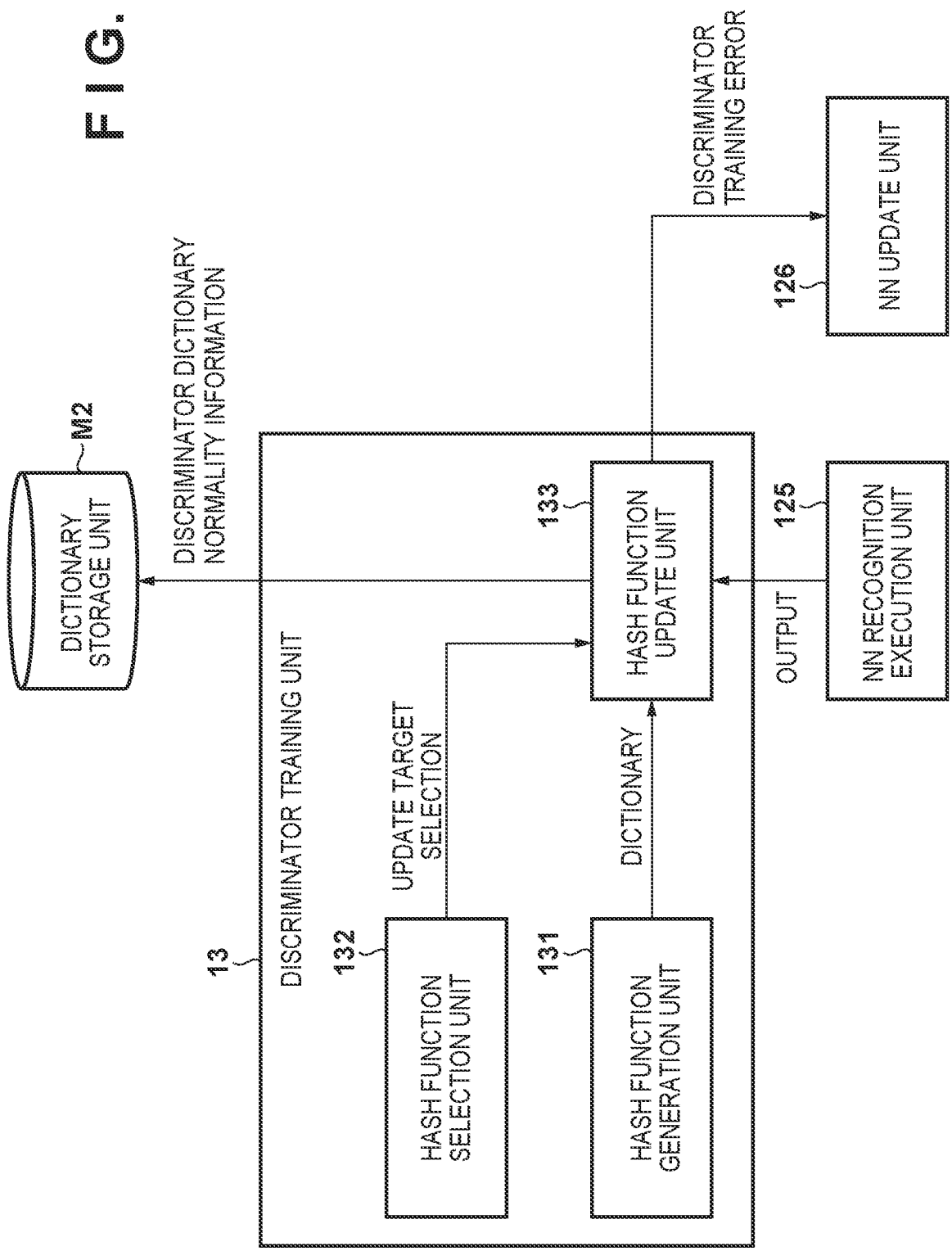
FIG. 6 is a block diagram showing an example of the arrangement of a discriminator training unit 13 according to an embodiment.

The arrangement of the discriminator training unit 13 will be described with reference to FIG. 6. The discriminator training unit 13 includes a hash function generation unit 131, a hash function selection unit 132, and a hash function update unit 133. Note that as described at the beginning of this embodiment, a discriminator using a hash function will be used as an example of a discriminator in this embodiment. Details of the hash function will be described later.

Figure 3:
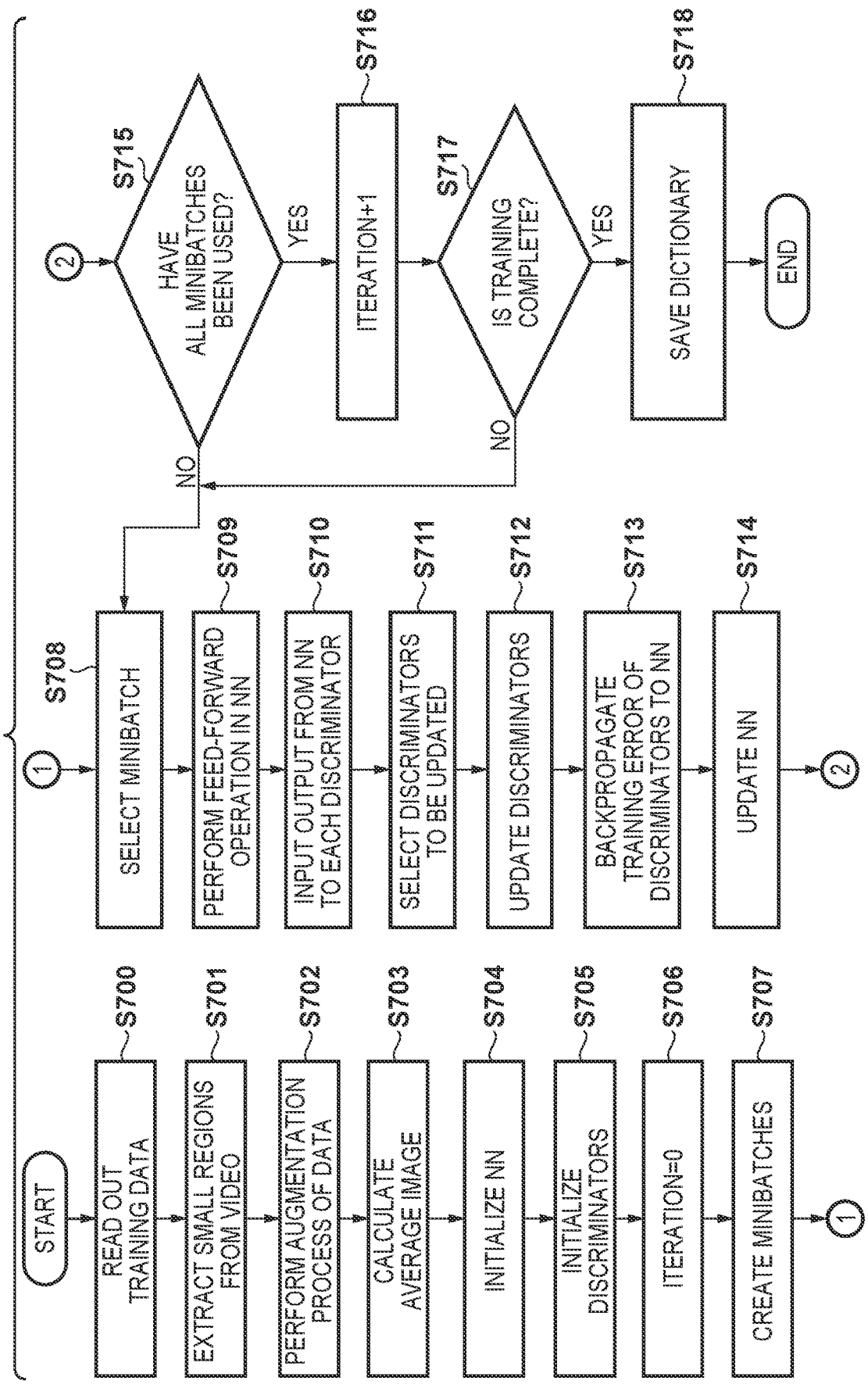
FIG. 3 is a flowchart illustrating an example of the operation of a training apparatus 10 according to an embodiment.

The operations of the NN training unit 12 and discriminator training unit 13 will be described in details with reference to FIG. 3. In step S701, the small region extraction unit 121 receives data from the data reading unit 11. This embodiment assumes that this data includes video data obtained by capturing with an image capturing apparatus such as a camera. This data can include video data obtained by capturing a monitoring target.

Figure 8:
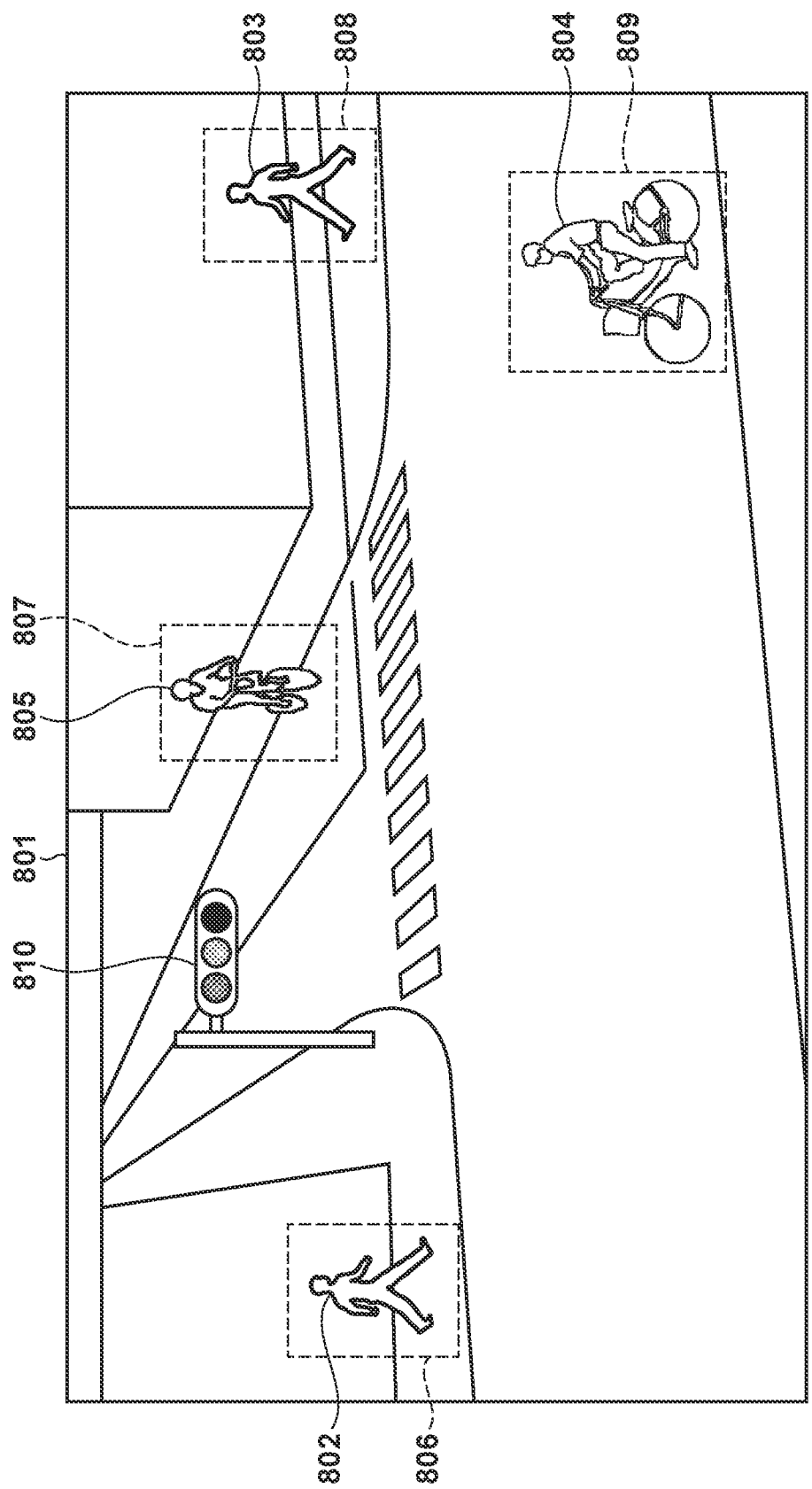
FIG. 8 is a view showing an example of a video used in an embodiment.

The small region extraction unit 121 extracts a small region image including an object in each frame of the video data. FIG. 8 shows an example of an image of one frame included in given video data. FIG. 8 shows, as an example of the frame image, an image 801 captured at a given intersection. The image 801 includes captured objects 802 to 805 and a signal 810. Bounding boxes 806 to 809 are rectangles respectively surrounding the objects 802 to 805. The small region extraction unit 121 extracts, as a small region image, each of partial images surrounded by the bounding boxes 806 to 809.

Note that the method of extracting a small region image based on a bounding box is merely an example, and a method used by the small region extraction unit 121 is not limited to this. There are a plurality of methods of extracting a small region image. For example, a background subtraction method, an object detection/tracking method, a segmentation method, or the like can be used. For example, by using the background subtraction method (to be described alter), the small region extraction unit 121 can extract the contours of the objects 802 to 805, and then extract, as small region images, partial images surrounded by the contours. Furthermore, if a monitoring target object is known in advance, the object detection/tracking method can be used. In the object detection/tracking method, an object set as a monitoring target can be detected/tracked. For example, it is possible to use, as the object detection/tracking method, a method described in H. Grabner, M. Grabner and H. Bischof, "Real-Time Tracking via On-line Boosting", Proceedings of the British Machine Conference, pages 6.1-6.10. BMVA Press, September 2006.

Furthermore, the small region extraction unit 121 adds supervisory information to each small region image using supervisory information added in advance to the video data. The supervisory information serves as a label indicating how to classify the target (that is, the object). In this embodiment, the user who uses or introduces the anomaly detection system 1 decides in advance label types and supervisory data to be added to training data. In general, a specific label added to a specific target depends on a task (for example, the application purpose of the anomaly detection system or the like).

More specifically, the user adds a label to a region designated on the image forming the video data. For example, the user can designate a region including the pedestrian 803 on the frame image, and add a label indicating a pedestrian to the region. Then, if the small region extraction unit 121 extracts a small region image from the region added with the label indicating the pedestrian, it can add supervisory information indicating a pedestrian to the small region image. If a plurality of regions added with different labels are extracted in a small region image, the label added to the region whose ratio to the small region image is highest can be added to the small region image as supervisory information.

It is not necessary to add supervisory information to a small region image by the above method. For example, small region images may be extracted in advance from the frame image, and the user may add supervisory information to each of the small region images. Alternatively, the user may add supervisory information to each of the small region images extracted by the small region extraction unit 121. With the above process, the small region extraction unit 121 extracts small region images each added with supervisory information from the frame image forming the video data. Finally, the small region extraction unit 121 sends, to the preprocessing unit 122, the extracted small region images as training images together with the pieces of supervisory information.

Note that for the sake of descriptive simplicity, in step S701, the small region extraction unit 121 reads out, at once, all data to be used, extracts small region images from each frame image, and sends all the small region images to the preprocessing unit 122. However, if the data amount of training data is very large and it is difficult to communicate all the data at once, the training data may be communicated sequentially. In the following description, assume that all training data are processed and communicated at once unless otherwise specified.

In step S702, the preprocessing unit 122 augments the input data. A data augmentation process is generally performed as preprocessing of training of the NN, and has an effect of increasing variations of training data seemingly. A kind of augmentation process to be performed can be selected depending on the task. For example, as a augmentation process which is generally performed for image data, there is an image process of inverting an input image in the horizontal direction. This method can be used when supervisory information remains unchanged even if the input image is inverted in the horizontal direction. On the other hand, if it is desired to detect a car heading in a wrong direction from the video of the intersection, as shown in FIG. 8, the right and left directions of the car are important, and thus another augmentation process is adopted. This embodiment assumes that an anomaly detection target is a human body in a video, and supervisory information added to a small region image indicating each human body remains unchanged even if the image is inverted in the horizontal direction. Therefore, in step S702, the preprocessing unit 122 performs an inversion process for each of the input training images, and handles the both images before and after the process as training data (training images) later.

In general, the preprocessing unit 122 can acquire image data representing a small region image and supervisory information indicating the type of this image, and generate a plurality of images from one image by an image process. At this time, the preprocessing unit 122 selects an image whose type is not changed by the image process, and performs the image process for the selected image. Then, the preprocessing unit 122 outputs the selected images before and after the image process as training data.

In step S703, the preprocessing unit 122 calculates the average image of all the training images, and performs a process of subtracting the average image from each of all the training images. Note that the average image indicates an image in which each pixel has, as a pixel value, the average pixel value of the corresponding pixels of the respective training images. The process of subtracting the average image from the training image corresponds to a process of subtracting the pixel value of the corresponding pixel of the average image from the pixel value of each pixel of the training image. Subtracting the average image from the training image corresponds to performing a kind of centering process for the training data. With such process, even if the pixel values of the respective training images are largely different, the training process of the NN can be readily converged. In this embodiment in which the training images having undergone the centering process are used, it is possible to use a Gaussian distribution with a mean value of 0 as the initial value of a connection weight in the initialization process of the NN (to be described later).

Note that in this embodiment, to calculate the average image, the preprocessing unit 122 further performs preprocessing of unifying the resolutions (vertical and horizontal sizes) of the training images. More specifically, with reference to the network structure of the NN to be initialized (to be described later), the preprocessing unit 122 can perform an enlargement or reduction process for each training image to match the size of an input layer (the network structure will be described later).

With the above-described process by the preprocessing unit 122, a plurality of sets of training images and added supervisory data are prepared and input to the training data selection unit 124. The NN is trained using the sets of training images and supervisory data which was added. In accordance with target detection accuracy, one or both of the augmentation process and the process of subtracting the average image by the preprocessing unit 122 can be omitted.

In step S704, the NN initialization unit 123 initializes the parameters (connection weight and bias terms) of the NN. In this embodiment, the network structure of the NN is determined in advance, and initialization is performed with reference to the network structure of the NN. The network structure and initial parameters used in this embodiment are not particularly limited. For example, the same method as in Krizhevsky may be used, or specifically defined network structure and initial parameters may be used.

Figure 9:
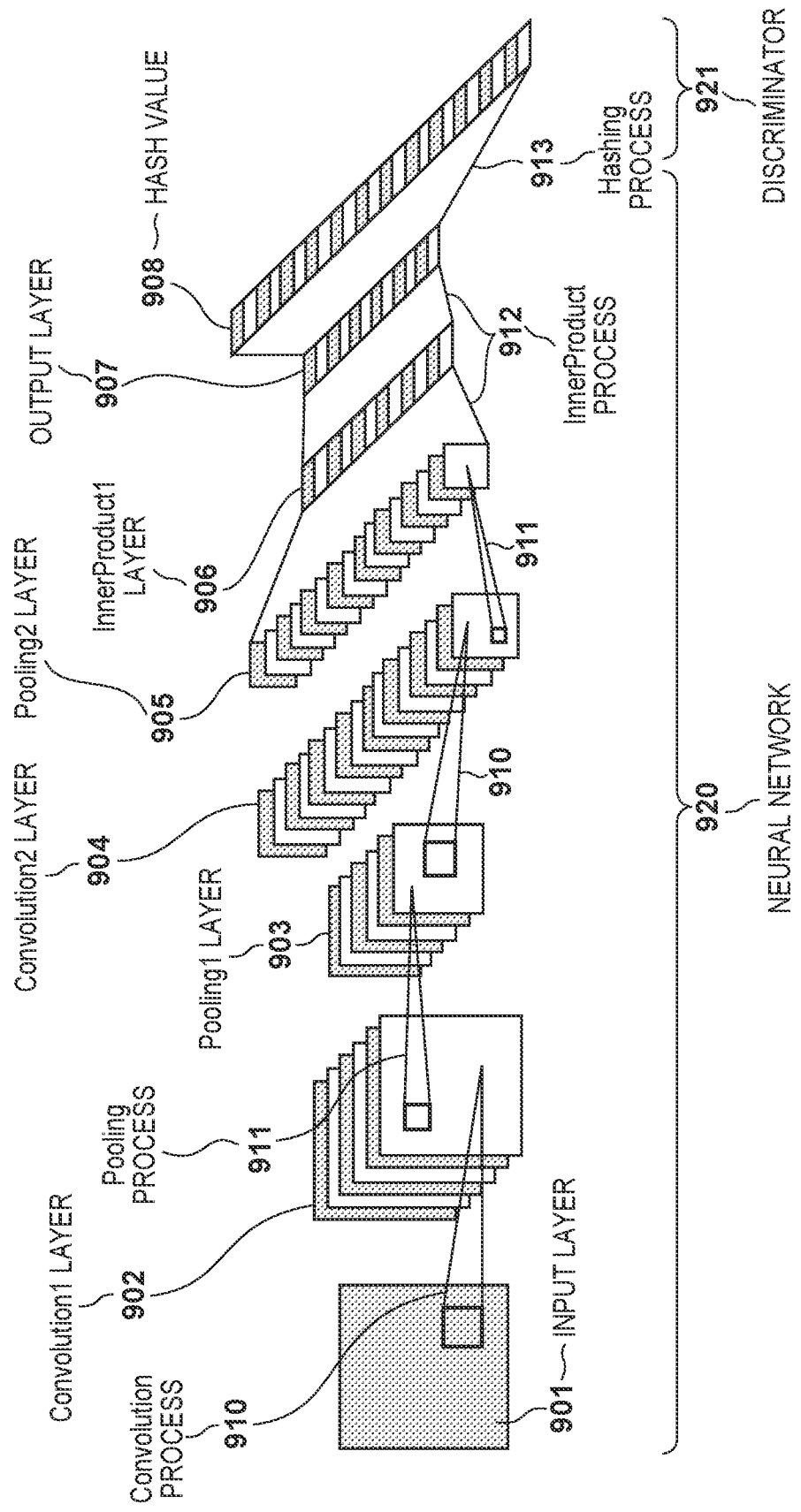
FIG. 9 is a view showing a combination of an NN and hash functions according to an embodiment.

FIG. 9 schematically shows examples of an NN 920 and discriminators 921, which are used in this embodiment. Note that details of the discriminators 921 will be described later. For the NN 920, an example of the network structure of the NN used in this embodiment is shown. FIG. 9 shows that the network includes an input layer 901, a Convolution1 layer 902, a Pooling1 layer 903, a Convolution2 layer 904, a Pooling2 layer 905, an InnerProduct1 layer 906, and an output layer 907. FIG. 9 also shows that a Convolution process 910, a Pooling process 911, and an InnerProduct process 912 are set as processing methods between two layers. Detailed contents of each process are the same as in Krizhevsky, and a description thereof will be omitted. Briefly, a data process using a convolution filter is performed in the Convolution process 910. In the Pooling process 911, if, for example, max pooling is used, a process of outputting a local maximum value is performed. In the InnerProduct process 912, an inner product processing is performed.

It will be apparent from FIG. 9 that a plurality of feature maps exist in each of the Convolution layers and the Pooling layers, and a plurality of neurons exist at a position corresponding to each pixel on an image in the input layer. For example, if the training image is in the RGB format, three neurons corresponding to the RGB channels can exist. Alternatively, if the training image is an Optical Flow image with motion information in the captured video, two neurons respectively representing motion in the horizontal axis direction of the image and motion in the vertical axis direction of the image can exist. If a plurality of images are used as input images, the neurons in the input layer can be increased in accordance with number of input images. This embodiment will explain an example of using a standard RGB image as a training image.

A method of initializing the parameters of the NN by the NN initialization unit 123 is not particularly limited. There are known various methods as an initialization method. For example, there are a case in which initialization is performed using prepared data and a case in which initialization is performed without using data. This embodiment will describe, as an example, a method of initializing the parameters of the NN without using data. More specifically, this embodiment assumes that the NN initialization unit 123 initializes the weight parameter using values randomly sampled from a Gaussian distribution with a mean of 0 and a variance of 1, and initializes all the bias term parameters to 0. With respect to details of the parameters, see Krizhevsky. Note that an example of the case in which initialization is performed using data will also be described later. Finally, the NN initialization unit 123 sends, to the NN recognition execution unit 125, a dictionary obtained by initialization.

In step S705, the hash function generation unit 131 initializes the discriminators. More specifically, the hash function generation unit 131 generates hash functions. In this embodiment, each hash function is handled as a linear discriminator. The number of generated hash functions is not particularly limited. However, by increasing the number of hash functions, it is possible to improve the accuracy of a nearest neighbor search. In this embodiment, as an example, the hash function generation unit 131 generates 100 hash functions. Finally, the hash function generation unit 131 sends the generated hash functions to the hash function update unit 133.

In this embodiment, each discriminator 921 is a one-class discriminator which determines, based on output data obtained by inputting input data to the NN, whether the NN belongs to a given class. More specifically, as shown in FIG. 9, based on an output from the NN (in this example, an output value from the output layer), each discriminator 921 obtains a hash value 908 by a Hashing process 913 using the hash function generated by the hash function generation unit 131. Each hash value 908 is a vector formed by a binary value representing a discrimination result obtained by each hash function, and a detailed description thereof will be given later.

The hash function used in the Hashing process 913 is not particularly limited. In this embodiment, as an example, a hash function described in Hachiya, H., Masakazu M., "NSH: Normality Sensitive Hashing for Anomaly Detection", 2013 IEEE International Conference on Computer Vision Workshops (ICCVW) (to be referred to as Hachiya hereinafter) and Japanese Patent Laid-Open No. 2014-203289 is used. The hash function described in these literatures is called Normality Sensitive Hashing (NSH), and is used in an example of an arrangement of an anomaly detection technique based on training with normal data. The anomaly detection technique based on training with normal data is characterized by training detectors for detecting an abnormality using training data including not abnormal data but normal data. In this embodiment, to provide a detailed description, an example of performing normal training using NSH will be explained. Note that if a hash function is trained using normal data and abnormal data, the objective function of the hash function corresponding to the abnormal data, as described in Japanese Patent Laid-Open No. 2014-203289, can be used, and a detailed description will be omitted. Note that the normal training is generally known as a kind of one-class training.

A detailed description of the hash function is provided in Hachiya, and will be omitted here. This embodiment assumes that the hash function is defined by equation (1) below of a hyperplane. Using the hash function, a binary value representing whether a feature vector exists on the direction side of a normal vector or on the opposite side when equation (1) of the hyperplane is set as a boundary is obtained. In this embodiment, when equation (1) of the hyperplane is set as a boundary, the hash value of the feature vector (input data) on a side represented by the normal vector direction is represented by a binary value "0", and the hash value of the feature vector (input data) on the opposite side is represented by a binary value "1". In this embodiment, each of a plurality of hash functions is trained so that the hash function returns a binary value "0" when the input data is normal, and returns a binary value "1" when the input data is abnormal.

$$w_m^T x - b_m = 0 \qquad (1)$$

where T represents the transposition of the vector, x represents the input data, w represents the normal vector or the weight vector of the hyperplane, b represents the bias term, and m represents an index for the hash function. As described above, in this embodiment, 100 hash functions are used, and m takes one of values of 1 to 100. The input data x is the output from the NN (that is, the output value of the output layer 907).

The left-hand side of equation (1) is represented by z, given by:

$$z = w_m^T x - b_m \quad (2)$$

When the input data x is on the side of the direction of the normal vector w, z takes a positive value, and when the input data x is on the opposite side, z takes a negative value. In this embodiment, as described in Hachiya, using this property, each hash function is evaluated using the formula (3):

$$E = \frac{1}{N} \sum_{i=1}^{N} L(w^T x_i - b) - \lambda b \quad (3)$$

where N represents the number of normal data (the size of a minibatch (to be described later)), and A represents the weight parameter of the bias term. Furthermore, $L(w^T x_i - b)$ represents a function of outputting an error when the input normal data $x_i$ is determined as abnormal data, and can be defined by:

$$L(z) = \begin{cases} 0 & (z \geq 0) \\ z^2 & (z < 0) \end{cases} \quad (4)$$

That is, $L(w^T x_i - b)$ represents an error in the discrimination result for training data using the hash function, and equation (3) indicates a loss of the hash function for the plurality of input normal data. Equation (3) can be considered to be better as the value is smaller. Note that in the above example, w and b are the parameters of the hash function, and λ is a hyperparameter. In this embodiment, λ is manually given in advance (for example, the same value as in Hachiya may be used), and w and b are randomly initialized.

In step S706, the training data selection unit 124 initializes a variable Iteration to 0. The variable Iteration indicates the iteration count of an optimization process and a detailed description thereof will be provided later. In step S707, the training data selection unit 124 creates subsets (minibatches) of training data. Each minibatch is a set of training data used to iteratively optimize the parameters of the NN by SGD (Stochastic Gradient Descent). In this embodiment, SGD is used as an example of a method of optimizing the parameters of the NN, and a detailed description thereof will be provided. Note that the size of each minibatch is not limited. In this embodiment, however, a set of 50 training images having supervisory information indicating the same label is used as a minibatch. For example, minibatches can be created so that each of all training images is included in one of the plurality of minibatches and so one training image is not included in two or more Minibatches.

For the sake of descriptive simplicity, training data used in this embodiment are uniformly balanced in terms of label types indicated by their supervisory information. That is, in step S707, the training data selection unit 124 generates the same number of minibatches for each of a plurality of labels. If the training data are not uniform in terms of the label types, for example, the training data can be sampled to be uniform.

The above process corresponds to preparation for training of the NN and discriminators (that is, optimization of the parameters). That is, with the above process, training data (training images) are obtained from the learning target data, and the NN and hash functions in the initial state are obtained. In step S708 and subsequent steps, the NN and discriminators are actually trained using the training data. This operation will be described below. In this embodiment, a method obtained by combining an error backpropagation method and SGD is used as a method of training the NN. This method is described in detail in Krizhevsky and a detailed description thereof will be omitted. Briefly, training is performed by repeating stochastic selection of a minibatch, calculation of its gradient, and updating the parameters in the gradient direction.

In step S708, the training data selection unit 124 randomly selects a minibatch from the set of minibatches. At this time, the training data selection unit 124 selects a minibatch which has not been selected while the value of Iteration remains the same. In this embodiment, in step S707, the training data selection unit 124 creates in advance all minibatches. However, every time the value of Iteration is incremented in step S716, the training data selection unit 124 may initialize the minibatches by creating new minibatches. With this arrangement, a combination of training data included in each minibatch changes for each iteration, and thus the chance of overtraining can be reduced.

In step S709, the NN recognition execution unit 125 inputs the training data to the NN, and obtains output data. More specifically, the NN recognition execution unit 125 obtains an output from the NN using the minibatch as input data. For example, if the NN shown in FIG. 9 is used, a data process using the NN is performed so as to perform a hierarchical feed-forward operation from the input layer 901 to the output layer 907. In step S710, the NN recognition execution unit 125 sends the output from the NN (the value of the output layer 907) to the discriminator training unit 13.

In step S711, the hash function selection unit 132 selects some of the plurality of discriminators. In this embodiment, the hash function selection unit 132 selects, for each minibatch, one or more hash functions to be updated among the hash functions generated in advance by the hash function generation unit 131. Only for the hash functions selected by the hash function selection unit 132, the hash function update unit 133 performs a parameter update process and calculates a discriminator error to be backpropagated to the NN. The process of selecting hash functions to be used will be referred to as a hash function dropout process hereinafter. This process is different from a dropout process for the NN described in Krizhevsky and has an effect of suppressing overtraining of the hash function for the complicated objective function (3). It is considered to improve the accuracy of the final recognition result by subsequently backpropagating the discrimination errors for the different sets of hash functions to the NN. Equation (2) is an expression related to all the hash functions. For the hash functions selected in step S711, however, equation (2) can be represented by:

$$z = \{w_d^T x - b_d | d \in D\} \quad (5)$$

where D represents the set of selected hash functions, d presents the index, and d∈D represents that d is an element of D.

The hash function selection unit 132 can stochastically select the set D of selected hash functions from all the sets of the hash functions. For example, the hash function selection unit 132 may determine whether to select each hash function at a probability of 50%. The unselected hash functions can be considered to be dropped out (turned off). That is, this process can be regarded as a dropout process for the hash functions.

Figure 10:
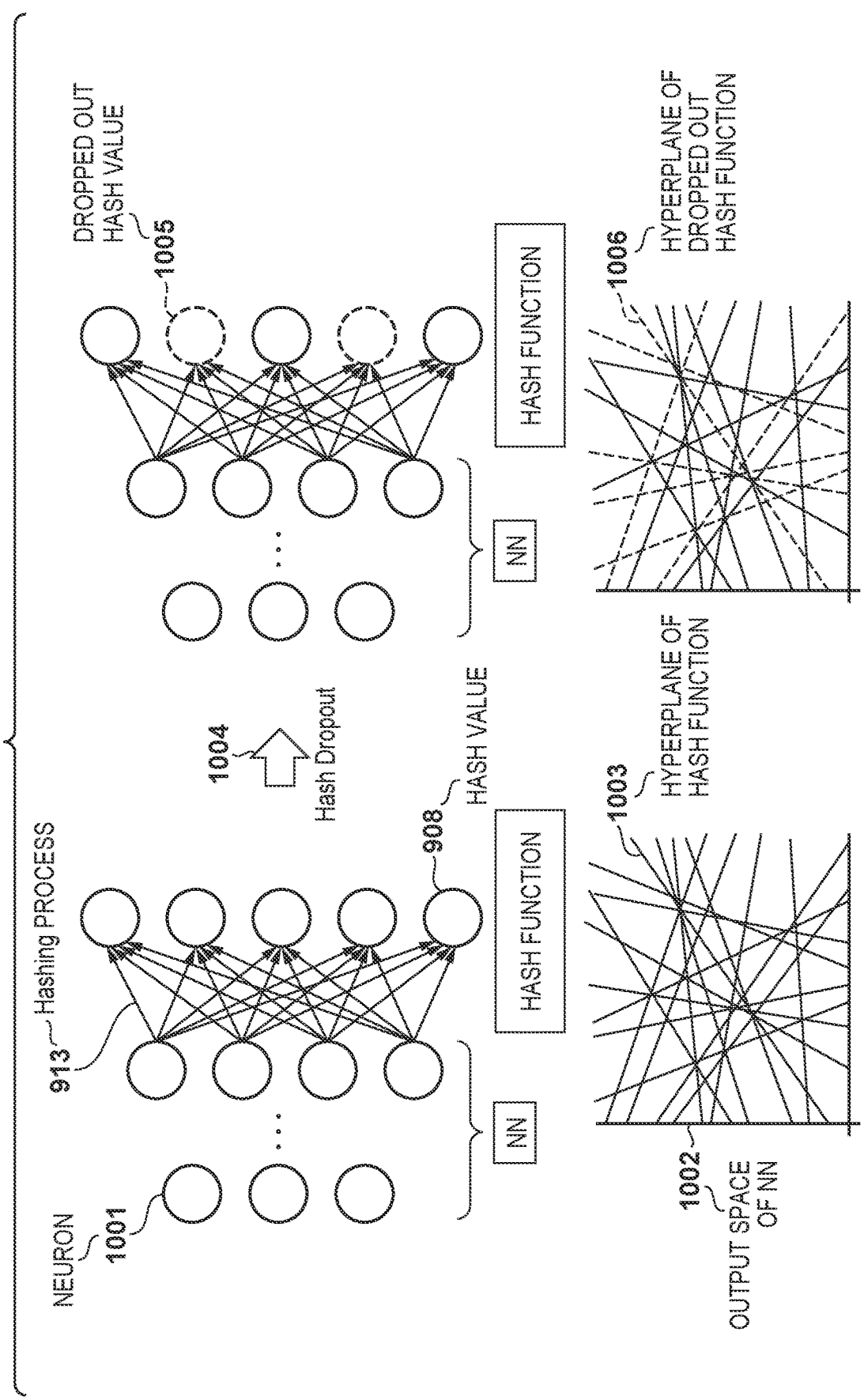
FIG. 10 is a view for explaining a hash function dropout operation.

To simplify the explanation of the process in step S711, FIG. 10 shows examples of the arrangements and operations of the above-described hash functions. Referring to FIG. 10, neurons 1001 represent the neurons of the NN. An output space 1002 of the NN indicates a schematic view of the output space of the NN (in this example, the values of the output layer 907 is distributed in this space). As represented with Hyperplanes 1003 of the hash functions, the plurality of hash functions as a hyperplane separate the output space 1002 of the NN. A hash dropout process 1004 indicates a process of selecting some hash functions (unselected hash functions are dropped out). As represented with dropped out hash values 1005, binary values are dropped out from vectors representing discrimination results when the hash functions are dropped out. Further, as represented with hyperplanes 1006 of the dropped out hash functions, the separating hyperplanes temporarily disappear when the hash functions are dropped out.

Every time step S711 is executed, the hash function selection unit 132 performs the hash function dropout process. Subsequently, the hash function update unit 133 calculates a gradient and an error for the set D of selected hash functions. That is, the hash function update unit 133 determines a discrimination result error obtained by inputting, to the first discriminator set, output data obtained by inputting the training data to the NN. The NN update unit 126 backpropagates the discrimination result error to the NN, thereby updating the parameters of the NN. Furthermore, the hash function update unit 133 determines a discrimination result error obtained by inputting, to the second discriminator set, output data obtained by inputting the training data to the NN after the update of the parameters. The NN update unit 126 backpropagates the discrimination result error to the NN, thereby updating the parameters of the NN again. The hash function selection unit 132 selects the first and second discriminator sets from the plurality of discriminators. Note that at least one of the discriminators included in the first discriminator set need not be included in the second discriminator set.

In step S712, the hash function update unit 133 determines a discrimination result error of training data obtained by inputting, to a plurality of discriminators, output data from the NN recognition execution unit 125. In this embodiment, a dropout process is performed. Thus, the hash function update unit 133 determines a discrimination result error obtained by inputting, to some discriminators selected by the hash function selection unit 132, the output data obtained by inputting the training data to the NN. At this time, the discriminators which have not been selected by the hash function selection unit 132 are not used to determine a discrimination result error. In this embodiment, the training process of the NN is performed, and therefore the thus obtained discrimination result error is backpropagated to the NN in step S714.

In this embodiment, since the training process of a plurality of discriminators is performed, the hash function update unit 133 further performs the training process of a plurality of discriminators based on the discrimination result error of the training data. More specifically, the hash function update unit 133 updates the hash functions selected by the hash function selection unit 132 based on the output from the NN, which has been received from the NN recognition execution unit 125. An arbitrary method can be adopted as a hash function update method. In this embodiment, however, the hash functions are updated based on a gradient method. For example, equation (6) below can be used as an update equation of the parameter w of the hash function and equation (7) below can be used as an update equation of the parameter b of the hash function.

$$w_{new} = w_{old} + \alpha \Delta_w \quad (6)$$

$$b_{new} = b_{old} + \beta \Delta_b \quad (7)$$

In equation (6), $w_{new}$ represents the parameter w after update, $w_{old}$ represents the parameter w before update, $\alpha$ represents a learning rate for w, and $\Delta_w$ represents the gradient of the parameter w. In equation (7), $b_{new}$ represents the parameter b after update, $b_{old}$ represents the parameter b before update, $\beta$ represents a learning rate for b, and $\Delta_b$ represents the gradient of the parameter b.

$\Delta_w$ can be obtained by partially differentiating equation (3) and, more specifically, can be obtained by:

$$\Delta_w = -\frac{\partial E}{\partial w} = -\frac{1}{N} \sum_{i=1}^{N} \frac{\partial L(w^T x_i - b)}{\partial w} \quad (8)$$

$\Delta_b$ can also be obtained by partially differentiating equation (3) and, more specifically, can be obtained by:

$$\Delta_b = -\frac{\partial E}{\partial b} = -\frac{1}{N} \sum_{i=1}^{N} \frac{\partial L(w^T x_i - b)}{\partial b} + \lambda \quad (9)$$

In equations (8) and (9), $L(w^T x_i - b)$ represents the discrimination error of the training data by the discriminator (hash function), as described with respect to equation (3). Based on $L(w^T x_i - b)$, the training process of the discriminator (hash function) is performed using equations (8) and (9). A method of calculating the gradient of the function L is not particularly limited. Furthermore, the learning rates $\alpha$ and $\beta$ can be arbitrarily decided, and can be decided by, for example, performing experimental adjustment.

As a method of performing the training process of the discriminator, a method of newly generating a hash function, as in Hachiya, may be adopted, instead of updating the hash function by the gradient method. Note that the example when the hash functions are updated has been explained. In fact, there may be a case in which only update of the NN is necessary and update of the hash functions is unnecessary. In this case, the hash functions need not be updated, as a matter of course. Note that at this time, the value of equation (3) may be backpropagated to the NN as an error without calculating the gradient of the hash function.

In step S713, the hash function update unit 133 sends the error of the hash functions to the NN update unit 126. In this embodiment, the hash function update unit 133 obtains the error of all the hash functions by:

$$\Delta_x = \frac{\partial E}{\partial x} = \frac{1}{N_D} \frac{1}{N} \sum_{d \in D} \sum_{i=1}^{N} \frac{\partial L(w_d^T x_i - b_d)}{\partial x_i} \quad (10)$$

Then, the hash function update unit 133 sends the obtained error to the NN update unit 126.

In equation (10), $N_D$ represents the number of hash functions selected by the hash function selection unit 132. A method of calculating the gradient of the function L of equation (10) is not particularly limited. In equation (10), $L(w_d^T x_i - b)$ represents the discrimination error of the training data by each discriminator (hash function), and an objective function E represents the error of all the selected hash functions (d∈D). As described above, the hash function update unit 133 determines the discrimination result error for all the plurality of hash functions. This error is determined based on the discrimination result errors of the training data by the plurality of hash functions, each of which is obtained by inputting the output data from the NN to each of the plurality of hash functions. Especially, in this embodiment, the discrimination result error for all the plurality of hash functions is determined as a linear combination of the discrimination result errors of the training data by the plurality of hash functions.

In step S714, the NN update unit 126 backpropagates the determined discrimination result error for all the plurality of discriminators to the NN. More specifically, the NN update unit 126 performs the training process of the NN by backpropagating the discrimination result errors by the hash functions to the NN. More specifically, the NN update unit 126 updates the parameters of the NN by an error backpropagation method using the received error of the hash functions. Updating the parameters of the NN by obtaining the gradient of the objective function in accordance with equation (10) corresponds to backpropagating the error of all the selected hash functions. As a method of updating the parameters of the NN, a known method in the NN technique can be used. In this embodiment, the NN update unit 126 updates the parameters of the NN using the same method as in Krizhevsky.

In step S715, the training data selection unit 124 determines whether all the minibatches have been used for training while the value of Iteration remains the same. If not all the minibatches have been used, the process returns to step S708, and training is performed using, as input data, a minibatch which has not been used for training. If all the minibatches have been used for training, the process shifts to step S716, and the training data selection unit 124 increments Iteration.

In step S717, the training data selection unit 124 determines whether training of the NN and discriminators is complete. More specifically, if predetermined training stop conditions are satisfied, the training data selection unit 124 determines that training of the NN and discriminators is complete. A method of setting training stop conditions is not particularly limited. For example, the user can set training stop conditions or the training data selection unit 124 can automatically set training stop conditions. As a practical example when the user sets training stop conditions, there is provided a method in which the user empirically sets training stop conditions, for example, a method of setting training stop conditions that the iteration count reaches a predetermined number. As a practical example when training stop conditions are automatically set, there is provided a method of referring to the gradient of a training curve. As a practical example, when the gradient, with respect to the iteration count, of the total of the errors obtained for all the hash functions in accordance with equation (3) becomes smaller than a predetermined value, it can be determined that training of the NN and discriminators is complete.

This embodiment assumes that when the iteration count reaches the predetermined number, the training stop conditions are satisfied. The predetermined number can be empirically set by the user, and the value is not particularly limited. For example, the predetermined number can be set to 20,000. Note that as a practical NN training method, for example, there is known a method of lowering the learning rate of the NN as the iteration count increases, as described in Krizhevsky. In this embodiment, such method can be adopted. If it is determined in step S717 that the training stop conditions are not satisfied, the process returns to step S708; otherwise, the process advances to step S718.

Finally, in step S718, the NN dictionary saving unit 127 saves the parameters of the trained NN (the dictionary of the NN) in the dictionary storage unit M1. Furthermore, the hash function update unit 133 saves the parameters of the trained hash functions (the dictionaries of the discriminators) in the dictionary storage unit M2. The hash function update unit 133 can also save information of normal data separated based on the trained hash functions (normality information). The normality information indicates the number of normal data (training data) discriminated by each hash function. For example, the normality information for a given hash function can indicate the number of training data whose hash values are "0". The normality information provides an index representing a degree of normality. For example, when the hash value of the input data obtained by a respective hash function is "0", the normality information indicates the likelihood that the input data is normal. Note that as an exemplary method of creating normality information, for example, a method described in Japanese Patent Laid-Open No. 2014-203289 can be adopted.

[Recognition Phase]

Figure 11:
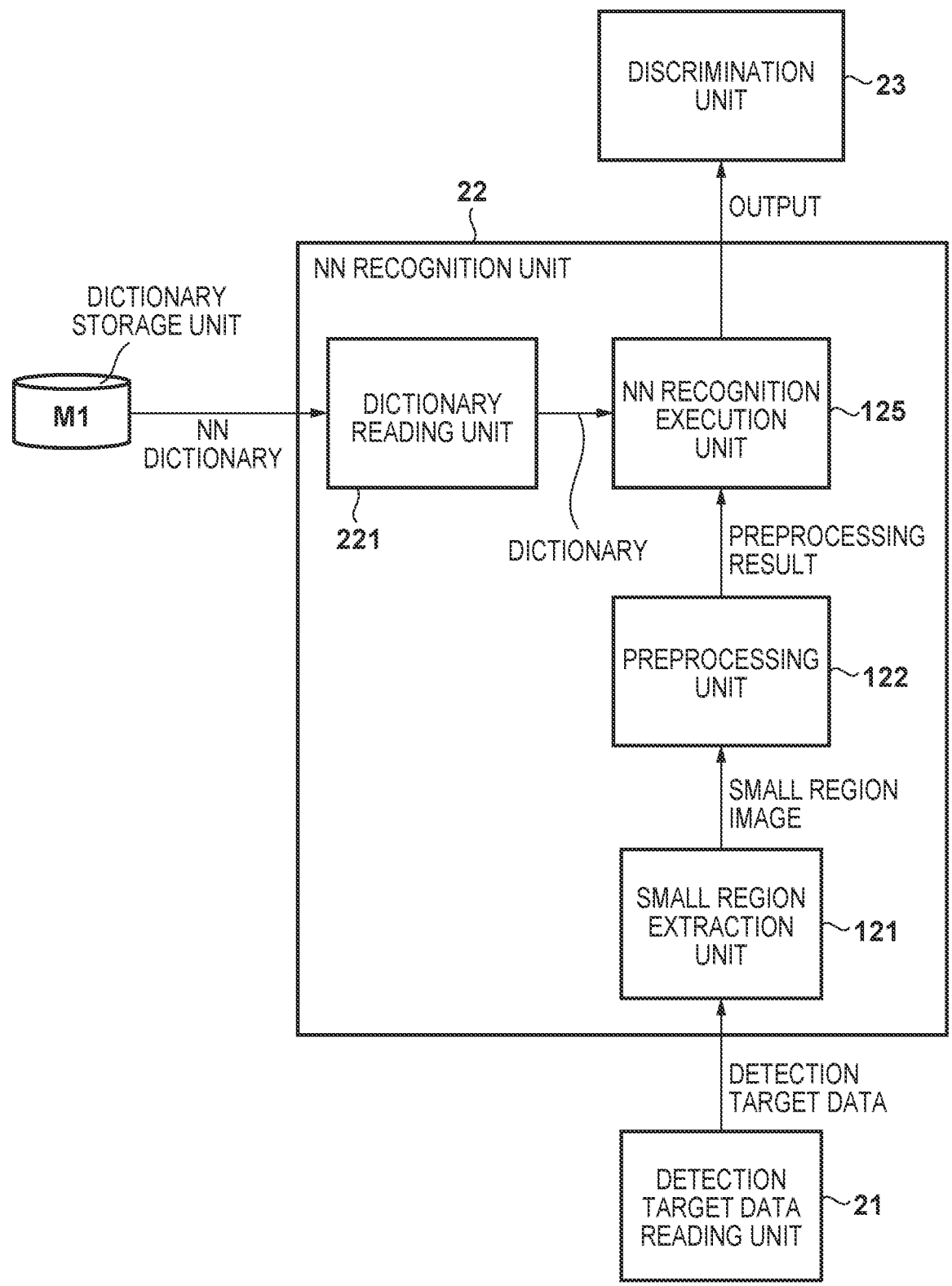
FIG. 11 is a block diagram showing an example of the arrangement of an NN recognition unit 22 according to an embodiment.

The NN recognition unit 22 and the discrimination unit 23 will be described in detail next. The arrangement of the NN recognition unit 22 will be explained first with reference to FIG. 11. The NN recognition unit 22 includes a small region extraction unit 121, a preprocessing unit 122, a dictionary reading unit 221, and an NN recognition execution unit 125. The small region extraction unit 121, the preprocessing unit 122, and the NN recognition execution unit 125 have the same functions as those of the processing units of the NN training unit 12. That is, the small region extraction unit 121 extracts a small region image from the detection target video data (image data), and the preprocessing unit 122 performs preprocessing for the extracted small region image. Then, the NN recognition execution unit 125 inputs the preprocessed small region image data to the NN as input data, and obtains an output. The dictionary reading unit 221 reads out the dictionary of the NN from the dictionary storage unit M1, and sets the parameters in the NN used in the NN recognition execution unit 125.

Figure 12:
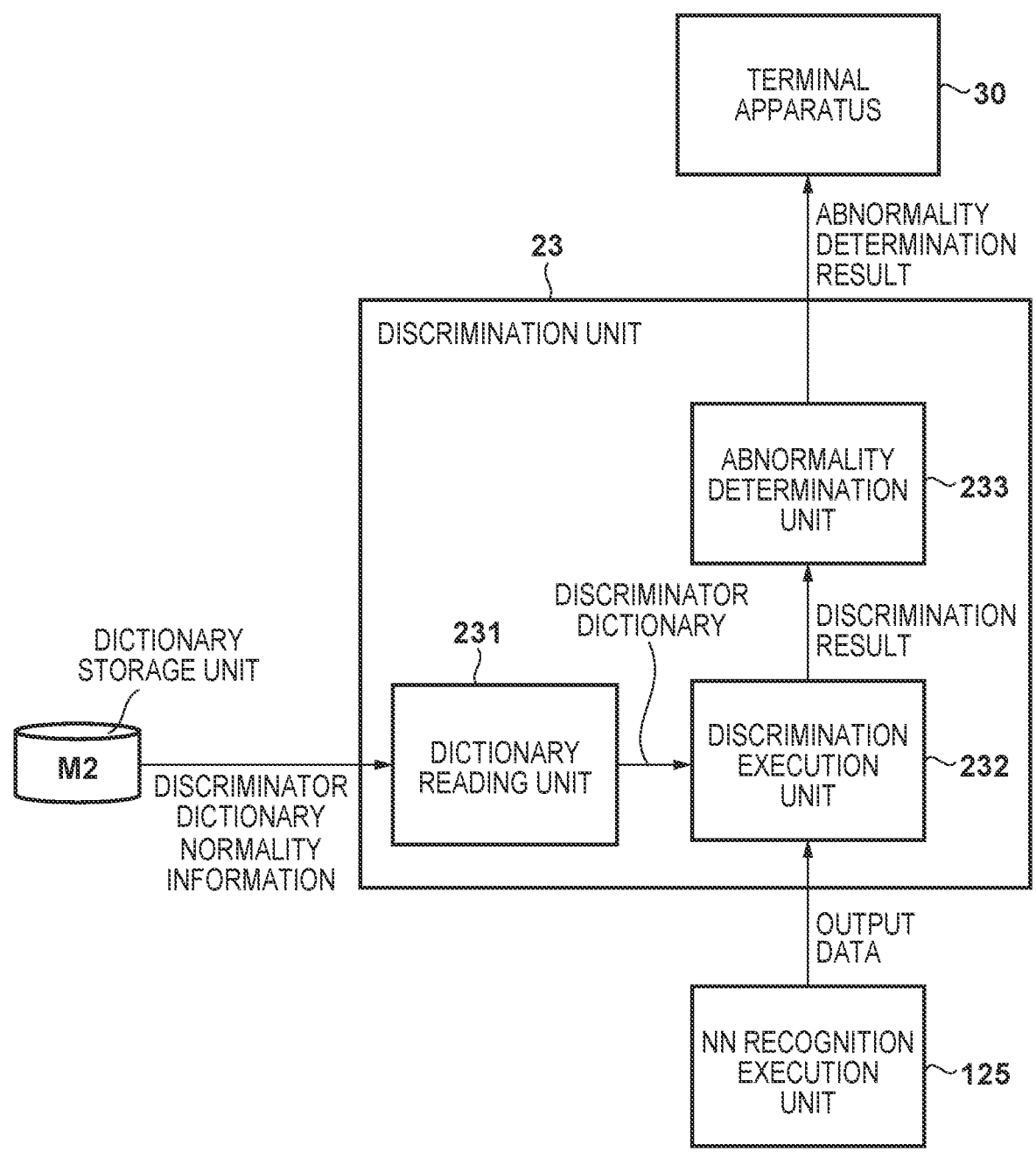
FIG. 12 is a block diagram showing an example of the arrangement of a discrimination unit 23 according to an embodiment.

The arrangement of the discrimination unit 23 will be described with reference to FIG. 12. The discrimination unit 23 includes a dictionary reading unit 231, a discrimination execution unit 232, and an abnormality determination unit 233. The dictionary reading unit 231 reads out the dictionaries of the discriminators from the dictionary storage unit M2, and sends the parameters of the hash functions to the discrimination execution unit 232. The discrimination execution unit 232 receives, from the NN recognition execution unit 125, the output data obtained by inputting the image data to the NN after the training process, and obtains a discrimination result by inputting the output data to the plurality of discriminators. For example, the discrimination execution unit 232 obtains a set of binary values by performing a process for the output result from the NN recognition execution unit 125 using the plurality of hash functions. The abnormality determination unit 233 detects an abnormality in the image data based on the output from the discrimination execution unit 232. It is determined whether an abnormality is included in the detection target video.

In this embodiment, the NN and hash functions obtained in the above-described training phase are used to discriminate detection target data. Note, however, that in the arrangement in which detection target data is discriminated by combining the NN and the plurality of discriminators, it is not essential to train the NN and the plurality of discriminators by the above-described method, and other methods may be used. In one embodiment, a plurality of discriminators are optimized by training so that evaluation becomes high as the similarity between the plurality of discriminators is lower. In one embodiment, the NN is obtained by the training process of backpropagating, to the NN, a discrimination result error obtained by inputting, to a plurality of discriminators, output data obtained by inputting training data to the NN.

Figure 4:
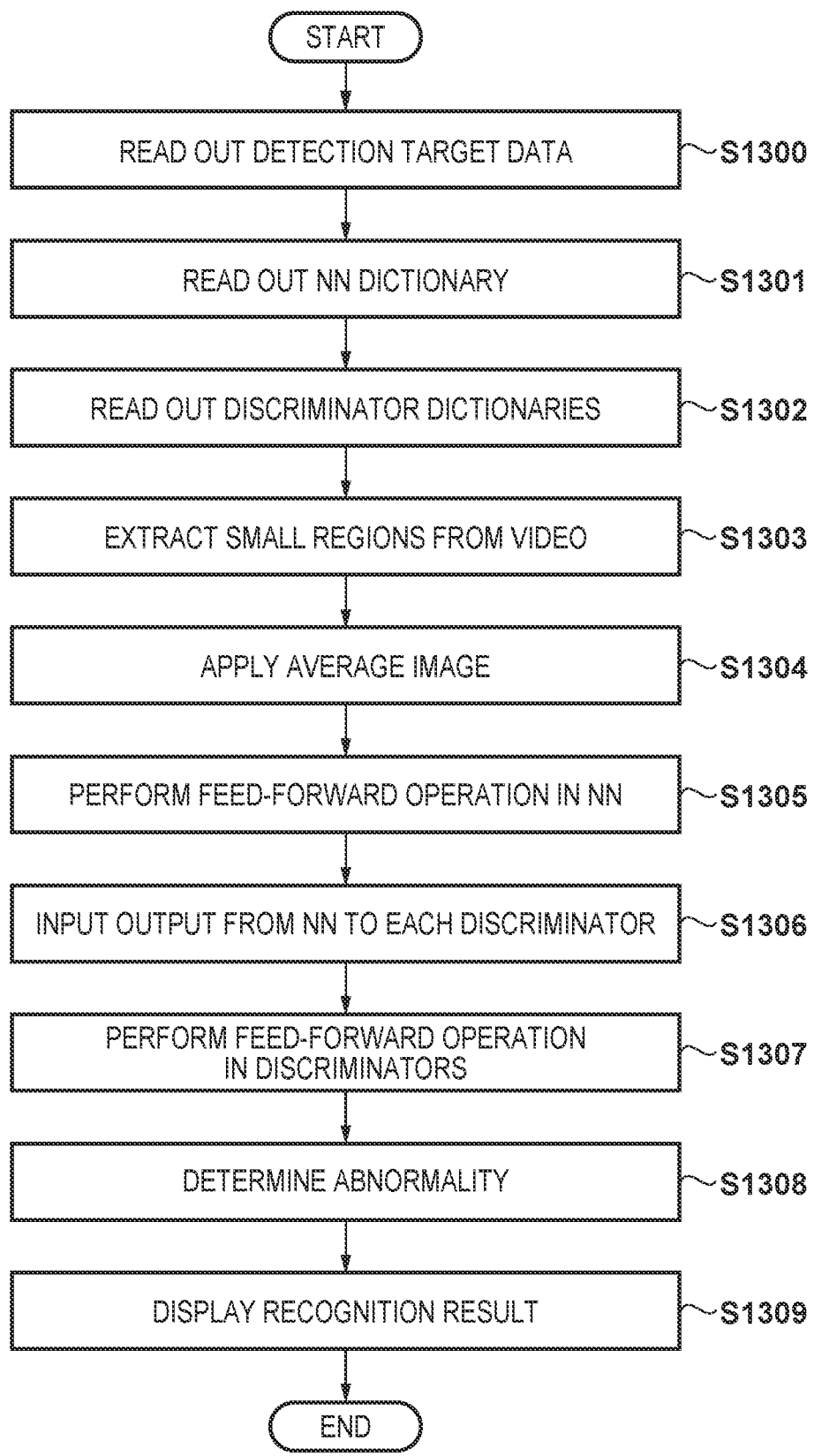
FIG. 4 is a flowchart illustrating an example of the operation of a recognition apparatus 20 according to an embodiment.

The operations of the NN recognition unit 22 and discrimination unit 23 will be described in detail with reference to FIG. 4. In step S1301, the dictionary reading unit 221 reads out the dictionary of the NN from the dictionary storage unit M1, and sends it to the NN recognition execution unit 125. In step S1302, the dictionary reading unit 231 reads out the dictionaries of the discriminators from the dictionary storage unit M2, and sends them to the discrimination execution unit 232. In this embodiment, the dictionary reading unit 231 further reads out the normality information from the dictionary storage unit M2.

In step S1303, the small region extraction unit 121 receives the detection target data, and extracts small regions from the detection target video. In step S1304, the preprocessing unit 122 performs a process of subtracting an average image from each small region image, and sends the obtained data to the NN recognition execution unit 125 as input data. In step S1305, the NN recognition execution unit 125 executes a recognition process by inputting, to the NN, the data obtained from the preprocessing unit 122, thereby obtaining an output.

In step S1306, the discrimination execution unit 232 receives the output from the NN recognition execution unit 125. In step S1307, the discrimination execution unit 232 performs a recognition process for the output (that is, the recognition result of the NN) from the NN recognition execution unit 125 using the trained hash functions. In accordance with the method described above in association with equation (1), the discrimination execution unit 232 obtains binary values for the recognition result of the NN based on the hash functions. Since the discrimination execution unit 232 processes the recognition result of the NN using each of the plurality of hash functions, a set of binary values is obtained in step S1307.

In step S1308, based on the set of binary values obtained in step S1307, the abnormality determination unit 233 determines whether the small region image is abnormal, that is, whether an abnormality is included in the detection target video. For example, a method described in Japanese Patent Laid-Open No. 2014-203289 can be used for the process in step S1308. Briefly, based on the number of normal data, where a binary value obtained by performing a recognition process for the normal data matches the binary value obtained in step S1307, it can be determined whether the input data is abnormal. In this embodiment, the dictionary reading unit 231 reads out the above number of normal data as normality information. It is not essential to refer to normality information in the determination process in step S1308. For example, if the plurality of binary values obtained in step S1307 all indicate that the small region image is normal (that is, the binary values are "0"), it can be determined that the small region image is normal. Alternatively, if, among the plurality of binary values obtained in step S1307, the ratio of binary values each indicating that the small region image as normal is a predetermined ratio or higher, it can be determined that the small region image is normal. In step S1309, if an abnormality is included in the detection target video, the discrimination execution unit 232 sends information indicating that the detection target video includes abnormality to the terminal apparatus 30.

In this embodiment, the NN is trained after randomly initializing the parameters of the NN. On the other hand, the trained NN may be reused to perform additional training using desired data (fine-tuning). For example, the parameters of the NN obtained in Krizhevsky may be used as initial values to perform training. At this time, if the supervisory information of the data set used in Krizhevsky is different from supervisory information of the training data in this embodiment, only the parameters of the output layer of the NN to be reused can be newly defined or initialized, thereby performing additional training. As a method other than fine-tuning, for example, unsupervised training may be performed using an autoencoder and parameters obtained by training may be used as initial values. As an exemplary method in this case, for example, a method described in Xie can be used.

In this embodiment, the example of combining the NN and hash functions as shown in FIG. 9 has been explained as an example. However, it is not essential to adopt the arrangement shown in FIG. 9, and a different arrangement may be used. For example, FIG. 9 shows the example in which the output value of the output layer 907 is used as input data of each hash function. However, the output from the Convolution2 layer 904 may also be used as input data of each hash function. In this case, in steps S710 and S1306, the output from the Convolution2 layer 904 and the output from the output layer 907 are input to each hash function. In this case, in step S713, the error of the hash function can be backpropagated to both the Convolution2 layer 904 and the output layer 907. Note that the training operation of the NN in which a plurality of errors are propagated is described in Christian Szegedy et al. "Going Deeper with Convolutions" Conference on Computer Vision and Pattern Recognition, 2015, and training can be performed using such method.

In this embodiment, the network structure of the NN shown in FIG. 9 has been described as an example. However, a network structure is not limited to this. For example, the InnerProduct1 layer 906 and the output layer 907 need not be used. By introducing hash functions instead of these two layers, a hierarchical hash function process may be executed.

In this embodiment, a case in which the data of the small region image extracted from the detection target video is used as the input data of the NN has been explained as an example. The input data is not limited to this. For example, an Optical Flow image may be extracted from a video and used as input data to the NN. Furthermore, an Optical Flow image and an RGB image may be input to different NNs and outputs from the NNs may be input to each hash function.

In this embodiment, in the arrangement in which the NN and hash functions for recognizing an object in data and its state are used and the output from the NN is used as input data to each hash function, an operation is performed so that the training errors of the hash functions are propagated to the NN, thereby performing training. Especially, this embodiment has explained the process of using the plurality of hash functions as discriminators and repeating training using only some selected hash functions, that is, the process of dropping out some hash functions at the time of training. However, it is not essential to perform a dropout process when using the plurality of discriminators. On the other hand, by performing a dropout process, it is possible to suppress overtraining of discriminators each of which receives the output from the NN and improve the accuracy of the final recognition result. The practical method of the dropout process is not particularly limited. In an example, the discrimination ability of the discriminator is deteriorated, and a discrimination result error obtained by inputting, to the discriminator with the deteriorated discrimination ability, output data obtained by inputting the training data to the NN is backpropagated to the NN. Dropping out some of the plurality of discriminators corresponds to deteriorating the discrimination ability of the plurality of discriminators.

The application example of the dropout process is limited to neither a case in which the hash functions are used nor a case in which the plurality of discriminators are used. For example, the same dropout process can be executed when another discriminator such as a support vector machine is used. If the support vector machine is used, the dropout process can be performed, as follows. That is, if discrimination is performed using the support vector machine, the inner product of the parameters of the support vector machine and the output from the NN is calculated. At this time, by dropping out some of the parameters of the support vector machine, it is possible to deteriorate the discrimination ability of the discriminator, thereby obtaining the effect of the dropout process. In this case, the value of the obtained inner product increases/decreases by the dropped out parameters. Thus, the value of the inner product obtained after the dropout process may be corrected. As an example, the inner product can be weighted based on the number of dropped out parameters and the total number of parameters. With this arrangement, the inner product obtained after the dropout process can be set to a value assumed to be obtained when all the parameters are used.

[Modification]

According to the first embodiment, in an example, equation (3) is used as an objective function used for training of the hash functions. A different objective function may be used. For example, training can be performed using an objective function whose evaluation value becomes higher as the orthogonality between the plurality of discriminators is higher. In an example, equation (11) below can be used as an objective function.

$$E = \sum_{i=1}^{M} \sum_{j=1}^{M} w_i^T w_j \quad (11)$$

subject_to: $z \geq 0$

Equation (11) indicates the objective function of all the hash functions. Subject_to indicates the constraint of equation (11). The definition of z is the same as in equation (5). That is, subject_to of equation (11) means that all the hash functions satisfy $z \geq 0$ for all the training data. M represents the number of hash functions.

In equation (11), the objective function E is expressed by an inner product for the parameters w of the hash functions. That is, as the orthogonality between the plurality of hash functions is higher, the objective function E becomes smaller, that is, the evaluation value becomes higher. Thus, by minimizing E of equation (11), the hash functions become almost orthogonal to each other as much as possible while satisfying the constraint. Furthermore, the norms of the hash functions become small. As described above, by performing training and optimization using equation (11), the hash functions are almost orthogonal to each other and the similarity between the hash functions is decreased.

If equation (11) is used, as described above, the possibility that each hash function undergoes greedy optimization is lowered. Therefore, as compared with a case in which equation (3) is used, the possibility that the plurality of hash functions obtained as a result of training include similar hash functions is lowered. By using equation (11), it can be expected to improve the expression of all the hash functions in the discriminators. Note that, in the above example, the equation (12) is designed using orthogonality as a representation of the similarity. Naturally, another expression of the similarity other than the orthogonality can be used. For example, a distance between the hash functions can be defined and then the equation (12) can be modified to use the defined distance. When the smaller value of equation (12) is evaluated higher, the equation (12) can be modified to use sign-inverted distance. Here, the distance between the hash functions can be defined in any appropriate ways. For example, the distance between the hash functions can be defined as a square of the difference between parameters of the different hash functions, such as a weight vector and an intercept. Further, a cosine similarity can be used as a representation of the orthogonality. The cosine similarity can represent an angle between the hash functions and is independent of a norm.

In equation (11), the constraint that z is equal to or larger than 0 for all the hash functions is used. The present invention, however, is not limited to this arrangement. For example, a given error may be allowed for z. As a method for this, for example, a soft margin for z may be introduced, as generally used in the support vector machine. By using an arrangement in which the constraint is relaxed, it can be expected to maintain the discrimination ability even if the training data includes noise.

As another method, a term including z may be added to the objective function, instead of using the constraint for z. For example, the hash function can be optimized using equation (12) below obtained by adding a term including z to the formula of the objective function E.

$$E = \sum_{i=1}^{M} \sum_{j=1}^{M} w_i^T w_j + \sum_{k}^{M} (-\min(z_k, 0))^p \quad (12)$$

where p represents a p-norm. For example, a squared norm can be used. In this case, p=2. The second term of equation (12) plays a role similar to the constraint for z of equation (11).

In the above embodiment, anomaly within a video is detected using an anomaly detection system. However, a part of or entire configurations as explained above can be used for another application. For example, a method as explained for the above embodiment can be applied to visual inspection on a product on a production line at a factory to detect defects. In this case, the NN recognition unit and the discrimination unit (i.e., the NN and the hash functions) can be trained using image data of a non-defective product as the normal data. With such an implementation, upon receiving image data of a product, it is possible to determine whether the product has a defect based on the output result from the discriminators. Note that the method disclosed in Japanese Patent Laid-Open No. 2014-203289 can be used as an exemplary method for the processing for determining whether anomaly exists, thus the details is omitted here.

In the above embodiment, a linear discriminator is used as an discriminator. However, the above embodiment can be expanded to use properties of a non-linear discriminator by mapping data to a kernel space (nonlinear mapping based on a kernel method). As a method to use a kernel, a method such as disclosed in B. Scholkopf et al. "Learning with Kernels: Support Vector Machine, Regularization, Optimization, and Beyond", MIT press, 2001 and A. Rahimi et al. "Random Features for Large-Scale Kernel Machines", Advances in Neural Information Processing Systems 20 (NIPS 2007) can be used.

The examples of the objective function used to optimize the hash function have been described above. Especially, by using equations (11) and (12), training can be performed so the plurality of hash functions are not similar to each other. However, the objective function is not limited to them. For example, in equations (11) and (12), the objective function is defined so that the hash functions are almost orthogonal to each other. However, another method may be used to define the similarity between the hash functions, and the hash functions may be trained so that the similarity is minimized using the objective function whose evaluation value becomes higher as the similarity between the plurality of discriminators is lower. For example, as a kind of similarity, the difference in average of parameters between the hash functions or the like may be used.

Second Embodiment

The first embodiment has explained the example in which NSH is used as hash functions combined with the NN. The second embodiment will describe an example in which p-stable hash is used as hash functions combined with an NN. For example, p-stable hash is described in M. Datar et al. "Locality-Sensitive Hashing Scheme Based on p-Stable Distributions", SoCG, 2004 (to be referred to as Datar hereinafter).

Most of the arrangement and operation of an anomaly detection system according to this embodiment is the same as in the first embodiment. The differences will be described below. The big differences between this embodiment and the first embodiment are a hash function generation method and a training method.

In this embodiment, a hash function generation unit 131 operates in accordance with the method described in Datar. A hash function used in this embodiment is defined by:

$$\left\lfloor \frac{w^T x + c}{r} \right\rfloor \quad (13)$$

where r is a constant which can take an arbitrary value, and c is, for example, a real number which takes a value falling within a range of [0, r]. A floor function is used in expression (13), and a value obtained by expression (13) is a value obtained by discarding the fraction portion of $((w^T x+c)/r)$. At this time, in accordance with an increase/decrease in c, the numerator of expression (13) is defined as a set of linear functions whose gradients are the same and whose intercepts move.

When the thus defined hash functions are used, a value which equally divides a section of [0, r] in accordance with an arbitrary constant can be used as the value of c. For example, when r=9 and a step is 1, c={0, 1, 2, 3, 4, 5, 6, 7, 8, 9}, and 10 parallel hash functions in total which are arranged at equal intervals are obtained. When the parameter x of expression (13) prepares a plurality of different hash functions, hash functions including a plurality of sets of parallel hash functions can be obtained.

When the thus obtained hash functions are used, there are variations as the method of a dropout process executed by a hash function selection unit 132. As the first method, all the hash functions are equally handled, and whether to stochastically perform a dropout process is determined for all the hash functions.

As the second method, for each of the sets of parallel hash functions obtained by changing the value of c, it can be determined whether to drop out all the parallel hash functions included in the set. In this method, it is possible to perform, for each of the plurality of sets, a process of stochastically determining whether to perform a dropout process.

There are variations as the method of a parameter update process executed by a hash function update unit 133. The parameters of all the hash functions can be individually updated. On the other hand, for the set of parallel hash functions, the parameters of the parallel hash functions included in the set can be equally updated so as to maintain the state in which the respective hash functions are arranged at equal intervals in parallel with each other.

For example, when updating the parameter of one hash function of the set of parallel hash functions, the parameter of another hash function included in the set can be updated in the same manner. That is, it is possible to perform a process of reflecting the change of the parameter of a given hash function in the set of hash functions to which the hash function belongs.

Figure 7:
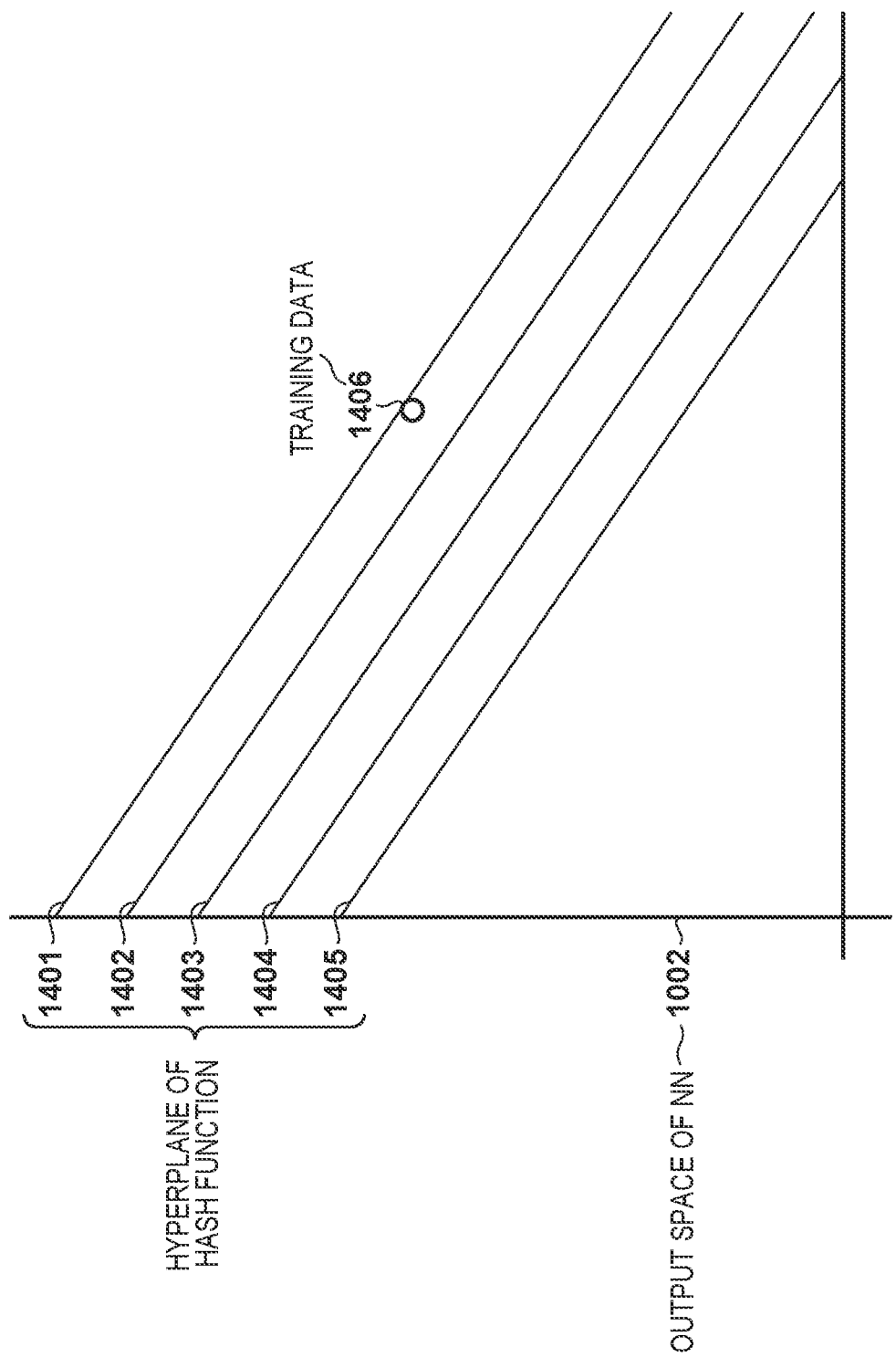
FIG. 7 is a view for explaining the hyperplanes of hash functions according to an embodiment.

In terms of a hash function based on which a parameter update amount is calculated, there are variations as a parameter update method. An example will be described below. FIG. 7 is a schematic view exemplifying the relationship between training data and a set of hash functions having a common parameter w. FIG. 7 shows hyperplanes 1401 to 1405 represented by the hash functions having the common parameter w, and training data 1406. An output from the NN is visualized as the training data 1406 which is input data to each has function.

If a parameter update amount is obtained using the training data 1406, a different update amount is calculated for each of the hash functions 1401 to 1405. At this time, the parameter update amounts of all the hash functions 1401 to 1405 may be obtained, and an update amount to be commonly applied to the set of the hash functions may be decided based on the update amounts. On the other hand, the parameter update amounts can be obtained based on some of the hash functions 1401 to 1405.

For example, the parameter update amount of one hash function can be obtained, and the obtained update amount can be commonly applied to the set of hash functions. In this case, as a method of selecting a hash function to be used to obtain a parameter update amount, there is provided a method of selecting a hash function which expresses the training data better. A practical selection method is not particularly limited. For example, the distance (the distance of a normal) from the hyperplane to the training data can be calculated for each hash function, and the hash function having the shortest distance can be selected. In the example of FIG. 7, the hyperplane 1401 of the hash function has the shortest distance to the training data 1406. Even if a parameter update amount is obtained using a plurality of training data included in a minibatch, as described in the first embodiment, the hash function can be selected based on the distances to the respective training data in the same manner.

Note that if the dropped out hash function is included in the set of hash functions, for example, if a dropout process is stochastically performed for all the hash functions, the hash function can be selected from the hash functions which have not been dropped out. For example, if the hash function corresponding to the hyperplane 1401 is dropped out in the example of FIG. 7, the hash function corresponding to the hyperplane having the shortest distance to the training data 1406 can be selected from the hash functions except for the dropped out hash function.

Third Embodiment

The first and second embodiments have explained the case in which hash functions are used as discriminators for performing discrimination using an output from an NN. The third embodiment will describe an example in which a discriminator is formed using AdaBoost. Note that AdaBoost indicates a method of forming one strong discriminator using a plurality of weak discriminators, and is a kind of boosting method. An example of AdaBoost is described in P. Viola et al. "Rapid Object Detection using a Boosted Cascade of Simple Features", CVPR 2001 (to be referred to as Viola hereinafter). However, there are variations as a practical method for executing AdaBoost. Note that a method described in the above literature and a method to be described in this embodiment are merely specific examples when one of various AdaBoost methods is used, and a boosting method to be used is not particularly limited.

Especially in this embodiment, the arrangement and operation of AdaBoost, exemplified as the analogy of the plurality of hash functions in the first and second embodiment, are specifically explained. More specifically, in this embodiment, there is a set of a plurality of weak discriminators each of which receives an output from an NN as input data, and an error of these discriminators is backpropagated to the NN. Note that in this embodiment as well, some of the weak discriminators are stochastically dropped out. As already described, however, a dropout process is not essential.

Most of the arrangement and operation of an anomaly detection system according to this embodiment is the same as in the first and second embodiments, and the differences will be described below. The big differences between this embodiment and the first embodiment are the fact that a plurality of weak discriminators are used as a discriminator, and the training method of the discriminator. That is, the arrangement of the anomaly detection system according to this embodiment is the same as that according to the first embodiment shown in FIG. 1 except that weak discriminators are used in a discriminator training unit 13 and a discrimination unit 23, instead of the hash functions.

Figure 13:
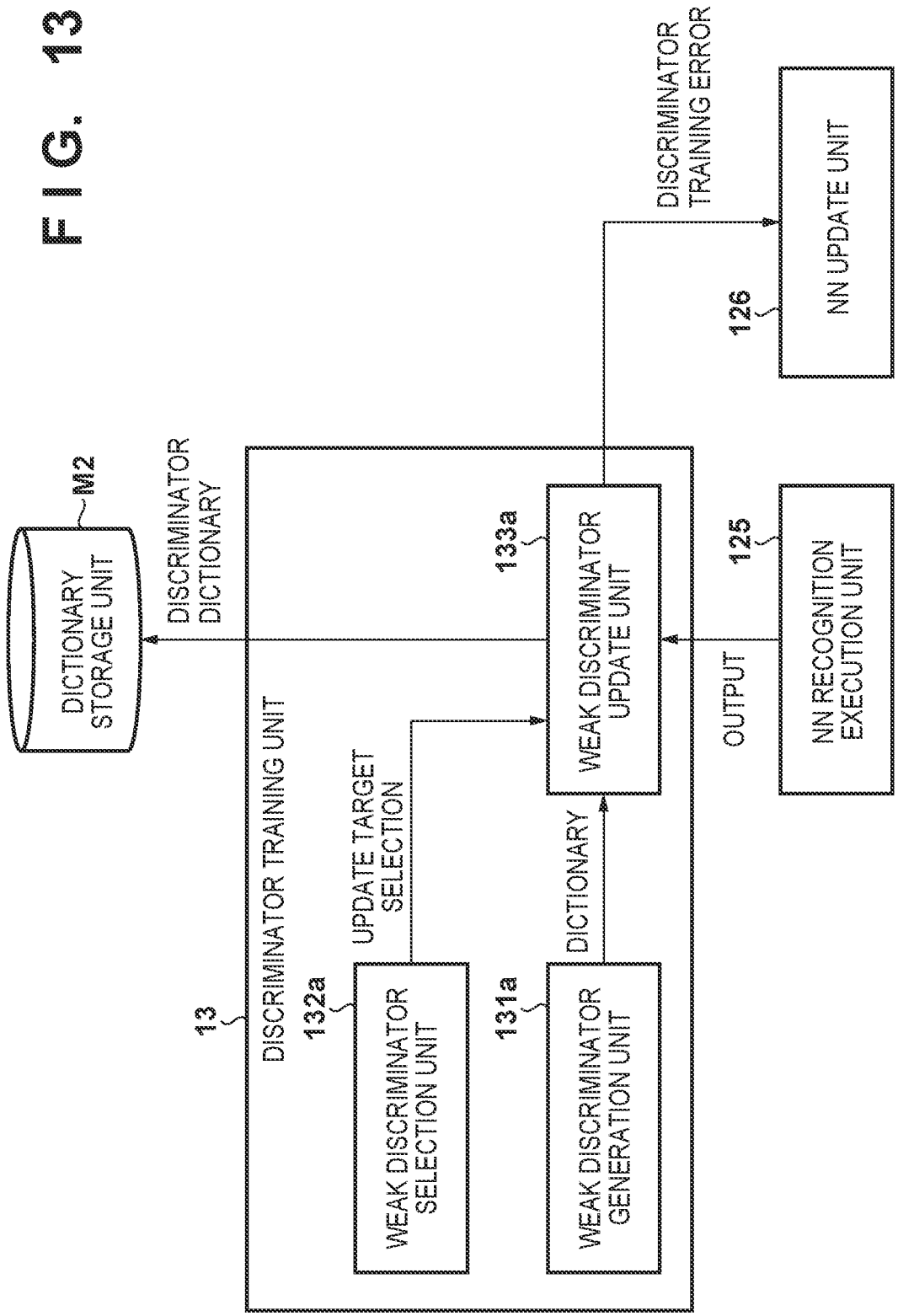
FIG. 13 is a block diagram showing an example of the arrangement of a discriminator training unit 13 according to an embodiment.

FIG. 13 shows an example of the arrangement of the discriminator training unit 13 according to this embodiment. The discriminator training unit 13 includes a weak discriminator generation unit 131*a*, a weak discriminator selection unit 132*a*, and a weak discriminator update unit 133*a*.

The operation of the discriminator training unit 13 will be described next. AdaBoost is known and, for example, an arrangement described in Viola can be used. An outline of the operation and characteristic processes in this embodiment will be described below.

The weak discriminator generation unit 131*a* generates a plurality of weak discriminators. At this time, the type of weak discriminators to be generated is not particularly limited. As an example, assume that linear discriminators are generated. In addition, the number of weak discriminators to be generated is not particularly limited. As an example, assume that 100 weak discriminators are generated. Note that as one variation of AdaBoost, there is a method of generating one weak discriminator first, and sequentially adding weak discriminators, and such method can be adopted. An example of the method of adding weak discriminators is the method described in Viola.

Using the thus generated weak discriminators, the weak discriminator generation unit 131*a* calculates the reliability of each weak discriminator. A reliability calculation method is not particularly limited. For example, the method described in Viola can be used. Note that when the weak discriminators are generated first, the weak discriminator generation unit 131*a* sets a normalized weight in each training data. As an exemplary the method described in Viola can be used.

The weak discriminator update unit 133*a* receives, from the NN recognition execution unit 125, the recognition result (output data) of the NN obtained by inputting each training data to the NN. For example, the weak discriminator update unit 133*a* can receive an output from an output layer 907, similarly to the first embodiment. The received recognition result of the NN is not particularly limited. For example, an output from another layer may be received.

The weak discriminator selection unit 132*a* selects some of the generated weak discriminators as weak discriminators to be used for training. Assume that this process is executed for each iteration of training, similarly to the first and second embodiments. At this time, a criterion for selecting weak discriminators is not particularly limited. For example, similarly to the first embodiment, the weak discriminator selection unit 132*a* can stochastically select each weak discriminator.

The weak discriminator update unit 133*a* selects, from the set of weak discriminators selected by the weak discriminator selection unit 132*a*, a weak discriminator which has a highest accuracy rate for a discrimination process using output data from the NN. The weak discriminator update unit 133*a* recalculates the reliability of the selected weak discriminator, and reassigns a weight to each training data. A reliability calculation and weighting method is not particularly limited. For example, the method described in Viola can be used. As an example, it is possible to increase the reliability of the selected weak discriminator as the accuracy is higher, and if the selected weak discriminator fails to discriminate training data, the weight of the training data can be increased. When employing the method of Viola, a discrimination error for the weak discriminator having the highest accuracy can be obtained as a discrimination result error for all the plurality of selected weak discriminators, and this error can be backpropagated to the NN. As another method, a discrimination error for a strong discriminator obtained by combining the weak discriminators in accordance with the reliabilities may be backpropagated to the NN.

After that, the weak discriminator update unit 133*a* can receive again, from the NN recognition execution unit 125, the recognition result (output data) of the NN obtained by inputting each training data to the NN after update. The subsequent process is the same as in the first embodiment, and the weak discriminator update unit 133*a* can repeat selection of weak discriminators to be used for training, calculation of a discrimination error, and backpropagation of the error to the NN.

On the other hand, the weak discriminator update unit 133*a* can set reliability in each weak discriminator by the above process. Then, a strong discriminator can be formed by combining the weak discriminators in accordance with the reliabilities. The parameters of the thus obtained strong discriminator are stored in a dictionary storage unit M2. In the operation of the recognition apparatus 20, a method used to perform a recognition process using the weak discriminators is not particularly limited. For example, the method described in Viola can be used. At this time, the training process of the weak discriminator is performed as a discriminator of an abnormality and normality.

In this embodiment, in the arrangement in which there are the NN and weak discriminators for recognizing an object in data and its state and an output from the NN is used as input data to each weak discriminator, an operation is performed so that the error of the weak discriminators is propagated to the NN, thereby performing training. At this time, by repeating a process of performing training using only some selected weak discriminators, it is possible to suppress overtraining of the weak discriminators and improve the accuracy of the final recognition result (anomaly detection result).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-153212, filed Aug. 3, 2016, which is hereby incorporated by reference herein in its entirety.

What is claimed is:

1. An information processing apparatus comprising:
at least one memory; and
one or more processors in communication with the at least one memory, the one or more processors configured to:
obtain output data by inputting training data to a recognition unit;
select a discriminator from a plurality of discriminators;
determine an error in a discrimination result of the selected discriminator for the training data obtained by inputting the output data to the selected discriminator;
train the selected discriminator based on the error in the discrimination result; and
train the recognition unit by backpropagating the error in the discrimination result to the recognition unit.

2. The apparatus according to claim 1, wherein the one or more processors are further configured to:
determine an error in a discrimination result for whole of the plurality of discriminators based on an error in a discrimination result for the training data by each of the plurality of discriminators, which are obtained by inputting the output data to each of the plurality of discriminators, and
backpropagate the determined error in the discrimination result for the plurality of discriminators to the recognition unit.

3. The apparatus according to claim 1, wherein the one or more processors are further configured to train the recognition unit by deteriorating discrimination ability of the plurality of discriminators, and backpropagating, to the recognition unit, the error in the discrimination result obtained while the discrimination ability is deteriorated.

4. The apparatus according to claim 1, wherein the one or more processors are further configured to:
select a first discriminator set and a second discriminator set from the plurality of discriminators,
update a parameter of the recognition unit by backpropagating, to the recognition unit, an error in a discrimination result obtained by inputting, to the first discriminator set, the output data obtained by inputting the training data to the recognition unit, and
update again the parameter of the recognition unit by backpropagating, to the recognition unit, an error in a discrimination result obtained by inputting, to the second discriminator set, the output data obtained by inputting the training data to the recognition unit after the update of the parameter.

5. The apparatus according to claim 1, wherein the one or more processors are further configured to train the plurality of discriminators based on the error in the discrimination result.

6. The apparatus according to claim 5, wherein the one or more processors are further configured to perform training using an objective function, wherein an evaluation by the objective function becomes higher as similarity between the plurality of discriminators is lower.

7. The apparatus according to claim 1, wherein the one or more processors are further configured to perform training using an objective function, wherein an evaluation by the objective function becomes higher as orthogonality between the plurality of discriminators is higher.

8. The apparatus according to claim 1, wherein the one or more processors are further configured to:
obtain image data representing images and supervisory information indicating respective types of the images, and generate a plurality of training data from single image of the images by image processing, and
select an image whose type is not changed by the image processing, perform the image processing for the selected image, and outputs, as the training data, the selected image before the image processing and the selected image after the image processing.

9. The apparatus according to claim 1, wherein the one or more processors are further configured to detect an abnormality in image data based on a discrimination result obtained by inputting, to the plurality of discriminators, output data obtained by inputting the image data to the recognition unit, after the training.

10. The apparatus according to claim 1, wherein the plurality of discriminators include one-class discriminators, weak discriminators, or hash functions.

11. The apparatus according to claim 1, wherein the one or more processors are further configured to perform recognition using a neural network.

12. The apparatus according to claim 1, wherein the one or more processors are further configured to input an image of a product to the recognition unit as the input data and output a result of defect detection on the product as the discrimination result.

13. The apparatus according to claim 1, wherein the plurality of discriminators are configured to nonlinearly map data based on a kernel method.

14. The apparatus according to claim 1, wherein
the plurality of discriminators are trained by performing one-class training based on the error in the discrimination result.

15. The apparatus according to claim 1, wherein the one or more processors are further configured to backpropagate the error in the discrimination result of the selected discriminator to the recognition unit without backpropagating an error in a discrimination result of any discriminator other than the selected discriminator in the plurality of discriminators other than the selected discriminator.

16. The apparatus according to claim 1, wherein the one or more processors are further configured to:
select a first discriminator set and a second discriminator set from the plurality of discriminators,
backpropagate an error in the discrimination result of the first discriminator set to the recognition unit without backpropagating an error in a discrimination result of any discriminator other than the first discriminator set in the plurality of discriminators; and
further backpropagate an error in the discrimination result of the second discriminator set to the recognition unit without backpropagating an error in a discrimination result of any discriminator other than the second discriminator set in the plurality of discriminators.

17. The apparatus according to claim 1, wherein the one or more processors are further configured to train the selected discriminator without training any discriminator other than the selected discriminator in the plurality of discriminators.

18. The apparatus according to claim 1, wherein the one or more processors are further configured to:
select a first discriminator set and a second discriminator set from the plurality of discriminators,
train the first discriminator set without training any discriminator other than the first discriminator set in the plurality of discriminators other than the first discriminator set; and
further train the second discriminator set without training any discriminator other than the second discriminator set in the plurality of discriminators.

19. An information processing apparatus for training a recognition unit of a system which obtains a discrimination result for input data by inputting, to a discriminator, output data obtained by inputting the input data to the recognition unit, comprising:
at least one memory; and
one or more processors in communication with the at least one memory, the one or more processors configured to:
train the recognition unit by deteriorating discrimination ability of the discriminator, and backpropagating, to the recognition unit, an error in a discrimination result obtained by inputting, to the discriminator with the deteriorated discrimination ability, output data obtained by inputting training data to the recognition unit.

20. An information processing method comprising:
obtaining output data by inputting training data to a recognition unit;
selecting a discriminator from a plurality of discriminators;
determining an error in a discrimination result of the selected discriminator for the training data obtained by inputting the output data to the selected discriminator;
training the selected discriminator based on the error in the discrimination result; and
training the recognition unit by backpropagating the error in the discrimination result to the recognition unit.

21. A non-transitory computer-readable medium storing a program which, when executed by a computer comprising a processor and a memory, causes the computer to:
obtain output data by inputting training data to a recognition unit;
select a discriminator from a plurality of discriminators;
determine an error in a discrimination result of the selected discriminator for the training data obtained by inputting the output data to the selected discriminator;
train the selected discriminator based on the error in the discrimination result; and
train the recognition unit by backpropagating the error in the discrimination result to the recognition unit.

* * * * *